(12) United States Patent
Gomez Fregoso et al.

(10) Patent No.: US 12,551,956 B2
(45) Date of Patent: Feb. 17, 2026

(54) CIRCULAR BLADE AND DEVICE FOR CUTTING ICE TUBES

(71) Applicant: Alejandro Gomez Fregoso, Jalisco (MX)

(72) Inventors: Alejandro Gomez Fregoso, Jalisco (MX); Ricardo Flores Ruiz, Jalisco (MX); Jose Juventino Tiscareno Velazquez, Jalisco (MX)

(73) Assignee: Alejandro Gomez Fregoso (MX)

( * ) Notice: Subject to any disclaimer, the term of this patent is extended or adjusted under 35 U.S.C. 154(b) by 186 days.

(21) Appl. No.: 18/560,653

(22) PCT Filed: May 21, 2021

(86) PCT No.: PCT/MX2021/000018
§ 371 (c)(1),
(2) Date: Nov. 13, 2023

(87) PCT Pub. No.: WO2022/240278
PCT Pub. Date: Nov. 17, 2022

(65) Prior Publication Data
US 2025/0269446 A1    Aug. 28, 2025

(30) Foreign Application Priority Data
May 13, 2021   (MX) .......................... a/2021/005704

(51) Int. Cl.
*B23D 61/02* (2006.01)
*F25C 5/14* (2006.01)

(52) U.S. Cl.
CPC .............. *B23D 61/025* (2013.01); *F25C 5/14* (2013.01)

(58) Field of Classification Search
CPC .................................. B23D 61/025; F25C 5/14
See application file for complete search history.

(56) References Cited

U.S. PATENT DOCUMENTS

| | | | |
|---|---|---|---|
| 81,812 A | 9/1868 | Miller | |
| 2,735,459 A | 2/1956 | Stauder | |
| 4,192,151 A | 3/1980 | Carpenter | |
| 4,454,901 A * | 6/1984 | Thorsness | B23D 61/021 83/854 |
| 9,989,294 B2 | 6/2018 | Romanillos Vazquez | |
| 2012/0047938 A1 | 3/2012 | Ku et al. | |
| 2014/0260877 A1 * | 9/2014 | Hall | B23D 65/02 83/835 |

(Continued)

FOREIGN PATENT DOCUMENTS

| | | |
|---|---|---|
| CN | 202032806 U | 11/2011 |
| CN | 111998582 A | 11/2020 |

(Continued)

*Primary Examiner* — Omar Flores Sanchez
(74) *Attorney, Agent, or Firm* — Patenting Consulting Group; Roberto J Rios

(57) ABSTRACT

Disclosed is a circular toothed blade, formed by a disc (1) having a central hole (2), wherein the blade comprises: a series of protrusions (5) separated by cut-outs (3) and projecting at an angle of 0-90° on the perimeter edge of the disc (1), wherein the protrusion (5) comprises a series of teeth projecting at an angle of 0-90°. Also disclosed is a device for cutting ice tubes, which comprises at least one circular blade (A) according to the present invention.

17 Claims, 26 Drawing Sheets

(56) References Cited

U.S. PATENT DOCUMENTS

2019/0210129 A1* 7/2019 Read ................... B23D 61/025
2023/0264279 A1* 8/2023 Patil .................... A01D 43/082
                                                                83/835

FOREIGN PATENT DOCUMENTS

| | | | |
|---|---|---|---|
| CN | 111998583 | A | 11/2020 |
| DE | 3346603 | A1 | 7/1984 |
| EP | 0231110 | A2 | 8/1987 |
| ES | 1059187 | U | 3/2005 |
| FR | 355253 | A | 10/1905 |

* cited by examiner

CIRCULAR BLADE AND DEVICE FOR CUTTING ICE TUBES

TECHNICAL FIELD OF THE INVENTION

This invention relates to the technical fields of Mechanics and Electrical, as it introduces a circular blade and a device for cutting ice tubes, that comprises the circular blade.

BACKGROUND OF THE INVENTION

There are industrial-level refrigeration systems on the market that produce ice in tubes using an evaporator made up of a series of vertical tubes; these refrigeration systems, comprise an ice-cutting equipment attached to the base of the evaporator with the purpose of cutting a substantial number of cylindrical ice bars, to a specific size.

For example, patent document ES1059187 (U) refers to an ice-cutting machine adaptable to a refrigerator that produces cylindrical ice bars 8 and is placed underneath it, in such a way that it cuts the cylindrical bars 8 in a plane perpendicular to their axis resulting in ice cubes of a specified height. The ice-cutting machine consists of a cylindrical tank 1 that houses in its interior the cutting and evacuation system for the ice cubes, and it simultaneously stores the water needed to form them.

The cutting elements consist of two circular blades 2 positioned at the top of the cylindrical tank 1, raised to a certain height from a support assembly 3 which serves as the base for the cylindrical bars 8, these blades are opposite to the central shaft 4.4 of the cylindrical tank 1, with the shaft of these circular blades 2 running parallel to it. Due to the cutting motion, all the cylindrical bars 8 coming from the refrigerator, first rest on the support assembly 3 or the circular blades 2, they are cut by these blades, which execute a compound motion involving a rotation and a circular translation, each obtained through the turn of a motor 4 and 5. Through the rotation each of the circular blades 2 turns around the shaft that goes through its center and with the second, the circular blades 2 revolve around the shaft of the cylindrical tank 1, thus sweeping its entire section. The rotation is powered by the rotation of a lower motor 4 affixed to a lower support 1.1 attached to the tank 1, which transmits the rotation to a lower driven pulley 4.1, whose axis is parallel to the axis of the cylindrical tank 1.

Through a toothed belt 4.2, the lower driven pulley 4.1 conveys the movement to a lower driven pulley 4.3, both coplanar in a horizontal plane, in whose interior a central shaft 4.4 is housed, which is in charge of transmitting the rotation to the upper part of the tank 1, where the circular blades 2 are positioned. At the top of the central shaft 4.4, an intermediate driving pulley 4.5 is housed and above it an upper driving pulley 4.6 which are in charge, through toothed belts 4.7, of transmitting the motion to an intermediate driven pulley 4.8 and to an upper driven pulley 4.9 situated in opposition to the central shaft 4.4 of the cylindrical tank 1. Inside the intermediate driven pulley 4.8 a larger shaft 4.10 is inserted and inside the upper driven pulley 4.9 a smaller shaft 4.11 is inserted, both are fixed at the top, the larger shaft 4.10 and the smaller shaft 4.11, with respective support plates 4.12 on which the circular blades 2 are mounted to cut the cylindrical ice bars 8. The circular translation is caused by the rotation of a gearmotor 5 placed on an upper bracket 1.2 affixed to the circumference of tank 1. This gear motor 5 transfers the rotation to a toothed wheel 5.1 which meshes with a crown wheel 5.2 located on the periphery of the support assembly 3 where the cylindrical ice bars 8 settle when they fall by gravity.

The support assembly 3 drives the movement of both the larger shaft 4.10 and the smaller shaft 4.11 according to the rotation transmitted by the gearmotor 5 but at the same time it does not restrict their rotation around themselves, allowing the circular blades 2 to rotate freely around their respective shafts 4.10, 4.11. In this way, both circular blades 2 rotate on their respective shafts 4.10 and 4.11, and traverse the entire surface of the support assembly 3, ensuring the cutting of all the cylindrical bars 8 that rest upon it. The support assembly 3 features grooves 3.1 beneath the circular blades 2, where the ice cubes fall once cut. Then, the cubes fall onto an intermediate platform 6, attached to the support assembly 3, which is positioned at the same height as a lateral window 1.3 of the cylindrical tank 1, through which said cubes exit.

The cylindrical tank 1 has at its bottom a suction conduit 1.4 to attach a pump, which, in addition to pushing the water from the cylindrical tank 1 to the top of the refrigerator, drives it to the circular blades 2 through some orifices 1.5 situated at the top of the cylindrical tank 1 to eliminate any remaining ice they might have after each cutting operation. Additionally, the cylindrical tank 1 has on its perimeter an overflow orifice 1.6 for the water contained within it, as well as an elbow 1.7 to which a pipe is connected, through which water overflowing the upper part of the refrigeration descends. Adjacent to the cylindrical tank 1 and in communication with it, there is a collection tank 7 with a replenishment conduit 7.4 that closes when the required level in the cylindrical tank 1 has been reached. The level of the cylindrical tank 1 is controlled by a float 7.5 that is connected to the replenishment conduit 7.4 by a rod 7.6, so that when the float 7.5 is below a minimum level, water enters until a maximum level is reached. The collection tank 7 has at its bottom, a drainage conduit 7.7 that opens and closes via a drainage valve 7.7.1 and at the height of the replenishment conduit 7.4, there is a solenoid valve 7.8 for automatic discharge, which opens during the defrost cycle, and allows hot water to enter and spray the cylindrical tank 1 through a diffuser 7.8.1 to eliminate remnants of ice and water.

Patent document MX363055 (B) describes an ice-cutting machine that comprises a cylindrical tank, on the upper part of which two circular blades are arranged, these circular blades rise above a rotating support assembly that forms a support base designed to receive cylindrical ice bars, the ice-cutting machine has a rotation motor and a translation motor, which impart a combined movement of rotation and translation to the circular blades; two crescent-shaped supports attached to the rotating assembly, which have a ramp with an upper surface above the level of the blades that prevents a plurality of cylindrical ice bars received in the rotating support assembly from coming into contact with the teeth of the blades, the ramp extends from its top surface down to a lower surface defined by the rotating support assembly. The circular blades are secured with screws to a clamping platform. The cylindrical tank is equipped with an inspection hatch and the rotation motor is mounted on a platform, which in turn is fixed to the cylindrical tank, and the rotating motor and the platform assembly are covered by a casing.

On the other hand, patent document CN202032806 (U) describes an ice-cutting device, which comprises: a rotating ice-cutting disk 1, an ice deflector disk 4, an ice outlet 5, and an outer cube of the ice tube machine 6. The tubular ice-cutting device is characterized by having a rotating shaft 3 that is connected to a circular saw blade 2 through a rotating shaft 7 positioned above the rotating ice-cutting disk 1, and the direction of rotation of the circular saw blade is opposite to the one of the rotating ice-cutting disk 1. The beneficial effects of this tubular ice-cutting device are the following: it adopts a form where two saw blades spin at high speed, the falling ice tube is cut according to the required length, to ensure that the length of the ice tube is identical, the end surface is smooth, the appearance is attractive, and the ice tube is convenient to use.

Patent document DE3346603 (A1) discloses a circular cutting blade for saws; and cutting elements to cut and eject the extracted material, whose cutting elements, such as cutting teeth, have a special curve shape on their cutting side, while one of the two sides of the intermediate space between two consecutive teeth), that is to say, the side or flank that precedes the respective tooth in the direction of the movement, has a slope or inclination that it is directed outward from the body of the disk, with special expansion grooves and tooth calibration, that impart a centrifugal motion to the extracted material and allow the work to be done satisfactorily and quickly.

While it is true that there are many ice-cutting systems on the market designed for human consumption and industrial use; which feature circular cutting components with various tooth patterns; there are also machines with a non-rotating straight blade with its own movement, but with orbital movement for ice cutting. These devices adapt to a vertical tube evaporator, to form ice bars, and produce a large amount of cut ice for its subsequent packaging in its commercial presentation. However, those circular cutting elements have several drawbacks, such as: they make thick cuts, due to the toothed pattern of their blades, which causes them to have a larger contact area, generating more ice pieces that originate from cutting the ice tubes, which results in ice loss; additionally, these ice particles adhere to the teeth of the cutting elements, causing a build-up in their throats, and preventing the teeth from fully engaging with the ice to make a fine or appropriate cut; and those systems that tend to solve the problem of frost jamming in the teeth of the blades use pumps that apply water to the blades to melt said frost, which results in higher energy and water consumption, and also, by applying water to the blades to melt the ice pieces, the ice bars also experience a degree of melting, causing them to lose their ideal shape and volume. In addition, current ice-cutting systems, have the drawback of not recycling the ice wastage generated by the cutting elements.

Due to the aforementioned issues, and in order to contribute to the solving of such inconveniences, a circular blade was developed, which has structural characteristics and a design that prevents the accumulation of frost on its teeth; also, a device for cutting ice bars has been developed, which can be used in machines that make ice bars.

The characteristic details of the present invention are clearly depicted in the following detailed description, which is complemented with examples and figures, which are included only to evidence the conception of said invention and some of its preferred embodiments.

DETAILED DESCRIPTION OF THE INVENTION

Figure 1:
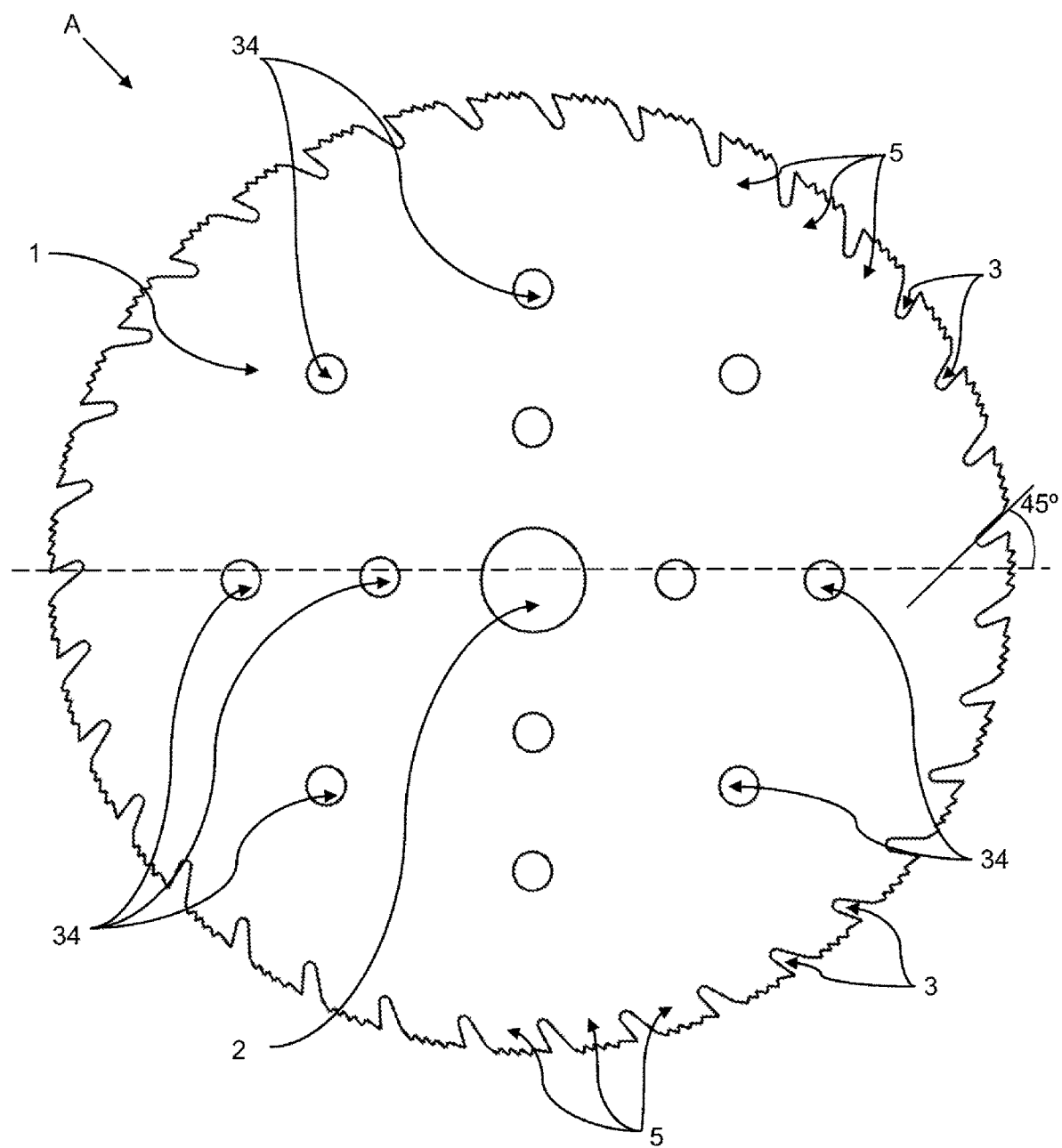
FIG. 1 is a top plan view of a circular blade with 35 toothed sections, as proposed by the present invention.

A first object of the present invention is a circular toothed blade, of those made up of a disk (1) with a central hole (2), where said blade features a series of protrusions (5) separated by notches (3) and projected at an angle ranging between 0 and 90° on the disk's peripheral edge (1); where said protrusion (5) further comprises, a series of teeth projected at an angle between 0 and 90°.

A variant of the circular blade (A) of the present invention is when the series of protrusions is 29 to 35 protrusions (5), separated by angled notches (3) and projected at 45°.

In another embodiment of the circular blade (A) the series of teeth consists of 5 teeth (6-10), whose tips have an angulation of 53, 71, 76, 54 and 73°, respectively and between tooth (6) and (7) there is an angle of 88°, between tooth (7) and (8) the angle is 79°, between tooth (8) and (9) the angle is 59°, and between tooth (9) and (10) the angle is 74°.

Another embodiment of the present circular blade (A) is that it can also include, strategically distributed fastening means (34) throughout the entire area of the circular blade (A); such as holes (34), protrusions, bores, and/or a combination thereof; for when it is fixed to a support bracket.

A second object of the present invention is a device for cutting ice tubes, which comprises:

i) at least, one circular blade (A);
ii) a support element firmly attached to the circular blade (A) to support and provide stability, but without interfering with the cutting of said blade (A);
iii) a cutting indicator platform (17) that functionally interacts with the circular blade (A) and the support element (11); where the platform (17) has, at least, one hole (18) located from its central point towards a peripheral point, which is sufficiently sized to accommodate the circular blade (A) and in turn allow it to have a rotational movement; the platform (17) is configured in two levels, where substantially one of its halves is at a higher level (19), compared to its other half (20), this difference in levels (21) is what determines the cutting length of the ice tubes (71); thus, the blade (A) is positioned at the height of the raised half's level (19); it is obvious to mention that when the device includes more than one circular blade (A), the platform (17) will adapt its configuration to functionally interact with the circular blades (A);
iv) a circular container (22) to house and support in its interior the assembly comprised of the platform (17), the support disk (11), and the circular blade (A); where said circular container (22) is open at its top, at its sides opposite each other, and the lower sections adjacent to these lateral sides, thereby forming an upper smooth ring (23), and a lower rectangular section made up of the parts of the lateral sides (24) and the base (25) that remained; an external toothed belt (26) was provided towards the upper smooth ring (23); and a hole (27) was provided in the base (25), located between the central point and a peripheral point of said base (25), and a flange (95) was provided in the hole (27); the cutting indicator platform (17) is press-fitted on the top of the circular container (22) at the level of the smooth ring (23);
v) a transmission box (28) that was externally affixed to the bottom of the base (25) of the circular container (22); which contains in its interior a pair of transmission gears, one central (30) and the other adjacent (29), and a central hole (31); a bearing cup (32) was fixed inside the transmission box (28), above the central hole (31), and the interior of said bearing cup (32) was machined with a stop (90) at its upper edge and a step (91) at its base, to create sufficient space to securely house a bearing (33), which supported and provided the rotational movement of the central transmission gear (30);
vi) a container (37) to house, support and protect the internal components of said equipment; which comprises: a cylindrical tank (38) closed at its lower end, but with a central hole (89), and open at its upper end; a tubular support jacket (39) open at both ends was vertically secured inside the cylindrical tank (38), where the lower end of this jacket (39) was inserted into the central hole (89) of the cylindrical tank (38); a flange (75) was positioned inside and on the base of the cylindrical tank (38), but tightly encircling a section of the lower end of the jacket (39), to firmly secure the support jacket (39); a plug-plate (76) was externally screwed onto the base of the cylindrical tank (38) and with the internal flange (75), where said plug-plate features a central hole to allow the passage of a transmission element; a bearing cup (74) was affixed inside the support jacket (39) and atop the inner section of the plug-plate (76); a lower bearing (77) was housed within the bearing cup (74), to facilitate the rotational movement of a transmission element; and the upper end of the jacket (39) features an internal annular step (53);
vii) a tubular connecting piece (36) to functionally connect the set of components consisting of: the blade (A) attached to the metallic support disk (11), the cutting indicator platform (17), the circular container (22) and the transmission box (28), to the container (37); where said connecting piece (36) consists of a tubular body (50) at whose upper end there is an external plate (35) which perpendicularly surrounds the tubular body (50), and said plate (35) is fixed beneath the transmission box (28); an annular step (51) is provided below the plate (35), which completely surrounded the tubular body (50), which was housed within the upper end of the support jacket (39);
viii) a straight bearing (52) encircling the tubular body (50) was placed beneath the annular step (51);
ix) a cylindrical tubular element (54) encircling the tubular body (50) was included to support the straight bearing (52);
x) a conical bearing (55) located beneath the cylindrical element (54) and is housed in the internal step (53) of the tubular support jacket (39);
xi) a cylindrical tubular jacket (56) that was fixed in a suspended manner below the external plate (35), where said jacket (56) encircles the upper section of the support jacket (39) where the connecting components were housed; the jacket (56) included a circular external protrusion (57) on its upper edge, angled at 90°, with respect to its longitudinal axis, and through this protrusion (57) it was attached to the plate (35); and the other end of the jacket (56) has another circular external protrusion (57') projected at 90°, with respect to the longitudinal axis of the jacket (56), but leaving a lower annular edge (58);
xii) a circular strainer (61) that was fixed below the jacket (56), to channel the ice pieces properly cut by the blade (A), towards the lateral exit (49) of the cylindrical tank (38); where the circular strainer (61) comprises, a circular disk (62) with a perforated center, which was affixed below the protrusion (57') of the jacket (56), and whose annular edge (58) was inserted into the central hole of said disk (62); and a series of rigid and slightly corrugated metallic strips (63) were welded around the disk (61) in a collinear plane and projected radially, the length and spacing of the metallic strips (63) were such that they did not allow the passage of the pieces of ice cut by the blade (A), to the bottom of the container (38), and allowed the circular strainer (61) to have a rotary movement to drag the ice pieces towards the exit (49); and a ring (64) was welded at the bottom of the ends of the metallic strips (63) to provide firmness to said strips (63);

xiii) a main shaft (65) housed longitudinally within the support jacket (39), passing internally through the duct of the lower section (50) and the bearing cup (32) of the connector piece (36) with its respective bearing (33), until connecting, via a key at its upper end, with the central gear (30) of the transmission box (28), to provide rotary motion to said central gear (30), and this gear in turn rotates the adjacent gear (29), through their mutual contact; the section of the lower end of the main shaft (65) that passes through the base of the cylindrical tank (38), is tightly encircled by the lower bearing (77) and the journal bearing (78), to enhance the smoothness of the rotary motion of said shaft (35); and at its end that extends outside the base of the cylindrical tank (38), it was provided with;

xiv) a belt pulley (79) connected to another pulley (80) which is driven by a transmission motor (81), to provide rotational motion to the circular blade (A);

xv) a rotating shaft (67) that connects the adjacent gear (29) to the metallic support disk (11), the ends of the rotating shaft (67) have 2 different diameters; wherein the tips (72) and (72') had the smaller diameter, and the adjoining sections (93) and (93') had an intermediate diameter, compared to the rest of the body of the rotating shaft (67); a key (94) was machined longitudinally on the upper part of the section (93); and another key (94') was machined longitudinally at the tip (72') of the rotating shaft (67), along with two transverse bores (70); where the lower tip (72) was passed through the central duct (68) of the adjacent gear (29) until it reached the bottom of the bearing cup cavity (32') where a bearing (66) is placed, thus, the tip (72) was inserted into the bore of the bearing (66), but without contacting the bottom of the cup (32'); and the adjoining section (93) was housed in the central duct (68) of the adjacent gear (29) and its key (94) was inserted into a longitudinal cavity in the duct (68), to securely fasten the rotating shaft (67) to the adjacent gear (29), and the larger diameter section serves as a stop to hold the adjacent gear (29) in place while it rotates; the upper end of the rotary shaft (67) passed through the hole (27) of the container (22) until the tip (72') was inserted in the circular cavity (14) of the bush (13), where said tip was fixed by inserting its key (94') into the internal radial groove (16) of the circular bush (13) and by introducing bolts (69) through the lateral holes (15) of the bush (13), until they were inserted into the holes (70) of the rotating shaft (67);

xvi) a tubular jacket (73) that was machined perpendicularly to an external circular base (96) with holes, at one of its ends, to surround the part of the rotating shaft (67) located between the base (25) of the circular container (22) and the support disk (11); therefore, the external base (96) of the jacket (73) was fixed onto the flange (27) at the base (25) of the container (22); the upper end of the jacket (73) included an annular recess (not illustrated) on its internal walls, forming an annular stop at the upper edge of the jacket (73) and an annular step to support;

xvii) a bearing (82) that surrounded the section (93') of the shaft (67), where said bearing (82) aids in the rotational movement of the shaft (67), which gives the support disk (11) a rotary movement; and xviii) a gear motor (not illustrated), to rotate the gear (60) which, in turn, rotates the entire circular container (22), when engaging with its toothed belt (26), in such a way, that the circular blade (A) has a translational movement with respect to the central and longitudinal axis of the container (37).

In an embodiment of the ice tube cutting device, in accordance with the present invention, the support element is a metallic disk (11) with a diameter smaller than the diameter of the circular blade (A), where said disk (11) has at the center of its upper face a circular protrusion (12) that is press-fitted and inserted into the hole (2) of the circular blade (A); the disk (11) also has holes (34'), whose distribution is exactly the same as the holes (34) of the blade (A), to insert connecting bolts (4), that pass through the holes (34) of the blade (A), until they are press-fitted into the holes (34') of the support disk (11); this way, the circular blade (A) and the support disk (11) are firmly joined to each together, jointly sustaining a rotational movement exceeding 1000 rpm, without separating; and such support disk (11) has at the center of its bottom face a circular bush (13) that has a circular cavity (14), to connect to an element of a transmission system, therefore said circular bush (13) was provided with, at least, two lateral holes (15) and an internal radial groove (16), for the insertion of a fixing element that will join the disc (11) with the element of the transmission system. Where a preferred embodiment of the equipment of the present invention is when the diameter of the support disc (11) is 30% smaller than the diameter of the blade (A), to allow a complete cut of the ice tubes.

Another variant of the device in question is when the step (21) has an inclination of 45° with respect to the horizontal plane of the halves (19) and (20), of the platform (17), to prevent the ice tubes (71) from being damaged when passing to the lower half (20); given that with the inclined step (21), they descend to the platform (20) by sliding; a preferred embodiment is when the inclination of the step (21) is 90% of the length of said step.

Another embodiment of the device of the present invention, is when the circular container (22), also includes a central support (84) to support the cutting indicator platform (17) beneath its central point, ensuring that said platform (17) does not sag under the weight of the ice tubes (71); for this, said support (84) is vertically fixed at the central point of the base (25) using flanges (85).

One more embodiment of the device according to this invention is when the circular container (22) also comprises a sawhorse structure (86) on its base (25) in order to facilitate the sliding of the pieces of already cut ice tubes, pieces and/or ice slush, and water, towards the bottom of the cutting equipment.

In another preferred embodiment of said device, the base of the transmission box (28), the external plate (35), and the protrusion (57) of the jacket (56), include fastening elements strategically and coincidently distributed to connect these elements; where the fastening means may consist of: holes (88) and (87), and connection bolts (92) that are inserted into the holes (88) of the transmission box (28), the holes (87) of the external plate (35), and the holes (not illustrated) of the protrusion (57), to join these three components together, to mention some examples.

In another embodiment of the device of the present invention, the container (37) also comprises:

i) a journal bearing (78) bolted to the lower part of the plug-plate (76), so that its rotation also helps the rotary motion of the transmission element, that is to say, of the shaft (65);

ii) at least 2 shafts (40) to provide increased vertical stability to the support jacket (39), where said support shafts were horizontally fixed between the support jacket (39) and the internal walls of the cylindrical tank (38);

iii) a ramp for channeling, frost and ice fragments that was provided below the shafts (40), in this case, the ramp was constructed from two sheets (41 and 41') whose configurations and dimensions are sufficient for their edges to seal against the inner wall of the cylindrical tank (38) and a hole (42) is provided to each sheet (41 and 41'), through which, the support jacket (39) passes; both sheets were fixed with an inclination of 45° with respect to the vertical axis of the cylindrical tank (38) in a complementary manner, resulting in one sheet (41) positioned above while the other (41') is below, with an overlap between them at the point where the support jacket (39) is located; the holes (42) must be well sealed against the external walls of the support jacket (39), to prevent frost and/or ice fragments from falling to the bottom of the cylindrical tank (38);

iv) a lower lateral hole (43) that is incorporated into the cylindrical tank, through which frost, ice fragments, and water exit the tank (38);

v) a first strainer (44) vertically positioned at the lower end of the sheet (41') and aligned with the lower lateral hole (43), to capture the frost and/or ice fragments produced by the cutting action of the circular blade (A);

vi) a second strainer (44') that was fixed externally and horizontally at the point where the lower edge of the bottom sheet (41') meets the lower edge of the first strainer (44), in such a way, that the frost and ice fragments that are not captured by the vertical strainer (44) are retained by the horizontal strainer (44');

vii) a collection tank (45) located at the lower lateral hole (43) of the cylindrical tank (38), to receive the frost and ice fragments, and water, coming from the cutting blade (A);

viii) a dividing wall (46) arranged vertically over the vertical strainer (44) to prevent the passage of frost and ice fragments in the event of an overflow;

ix) a water source that is provided in the collection tank (45), which is a valve with a float (47), to interrupt the water flow once the water level in the collection tank (45) has reached its limit; where the water that comes from the water source, helps to melt the frost and ice pieces that are discharged in the strainers (44 and 44'), by having a higher temperature;

x) a cap (48) to cover the top part of the collection tank (45);

xi) a bottom outlet (83) in the cylindrical tank (38) to connect a conventional water pump motor for water recirculation to the ice-making cooling unit;

xii) a lateral outlet (49) in the cylindrical tank (38) for the exit of the cut ice pieces; and xiii) an upper lateral hole (59) in the cylindrical tank (38), where an external gear (60) that meshes with the toothed belt (26) of the circular container (22) is adapted.

Another variant of the device for cutting ice tubes, as described by the present invention, is when the tubular connector piece (36) can be machined in a single piece comprising: its tubular body (50), the bearing cup (32), the external plate (35) situated where the tubular body (50) and the cup (32) join; and the annular step (51).

In another embodiment of the device of the present invention, the cutting indicator platform (17), also comprises, an adjusting cutting plate (not illustrated), which has the same configuration and dimensions as the lower half (20) of the platform (17); where this adjusting cutting plate (not shown) is positioned, horizontally and parallel above the lower half (20), at a height determined by the cut length of the ice tubes (71), through some fixing and supporting elements (not illustrated). With this, the equipment in question, acquires the advantage of being able to make cuts at different lengths of the ice tubes, to obtain pieces according to the desired length.

EXAMPLES

The following examples highlight some of the preferred embodiments of the present invention, which are meant to be purely illustrative, and should not limit the scope of the present invention.

Example 1. Circular Blade with 35 Toothed Sections

A circular blade (A) with 35 toothed sections (5) was manufactured, for this a stainless-steel disk (1) with a diameter of 54.10 cm, a thickness of 2.5 mm, and a central hole (2) of 3.5 cm was used. To this disk (1) 35 truncated conical notches or grooves (3) were machined perimetrically with an inclination of 45°, where their broad end was 1.21 cm and their narrow end 0.66 cm, with a depth of 1.89 cm and the separation between notches or grooves (3) was 3.82 cm. With these notches, the clogging of frost or ice pieces, caused by the cutting of the ice tubes, a problem that conventional saws have due to having pointed notches or grooves, has been avoided.

Figure 2:
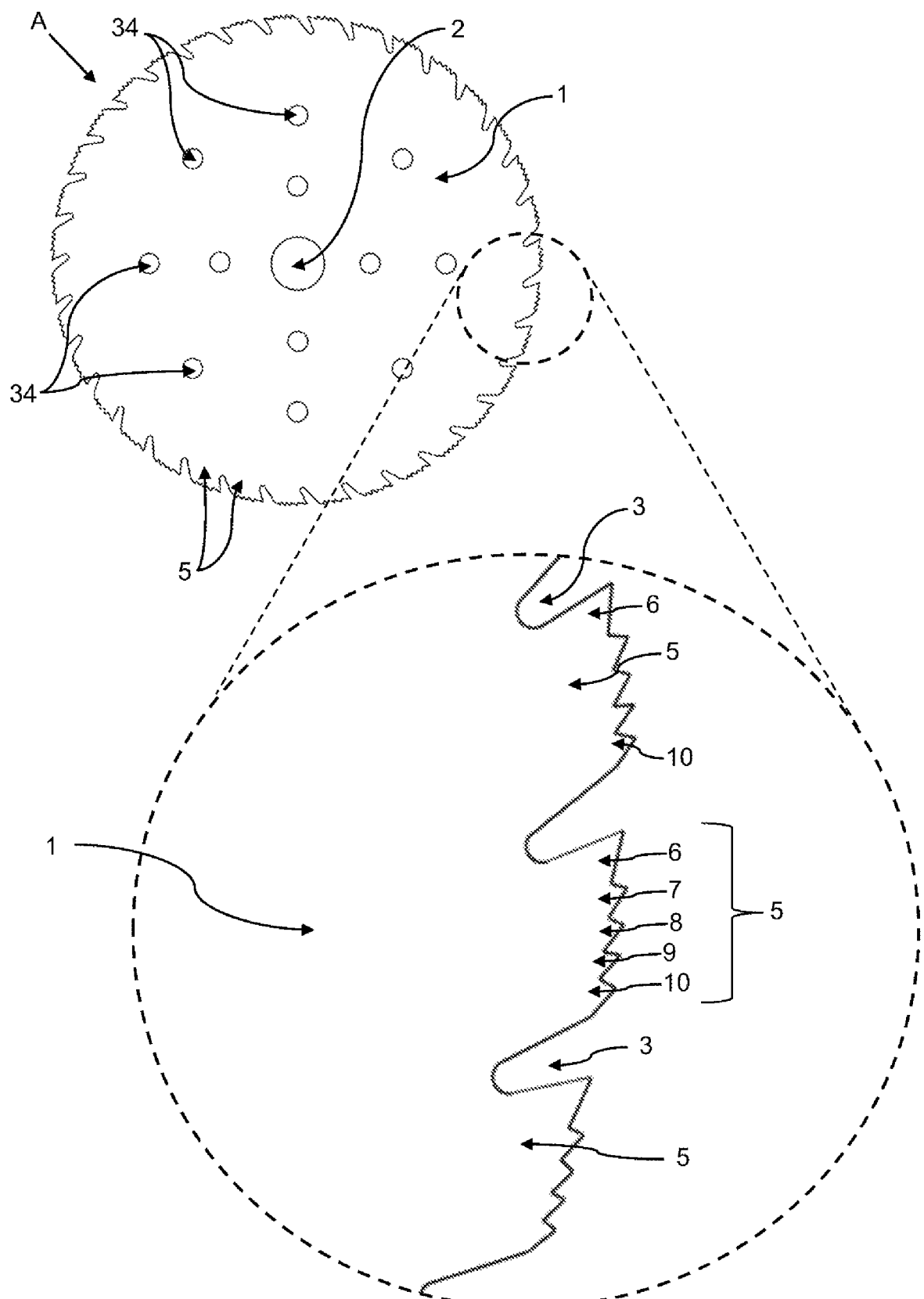
FIG. 2 is a top plan view of a peripheral section of the circular blade depicted in the previous figure, where the teeth of these toothed sections are observed in more detail.
Figure 3:
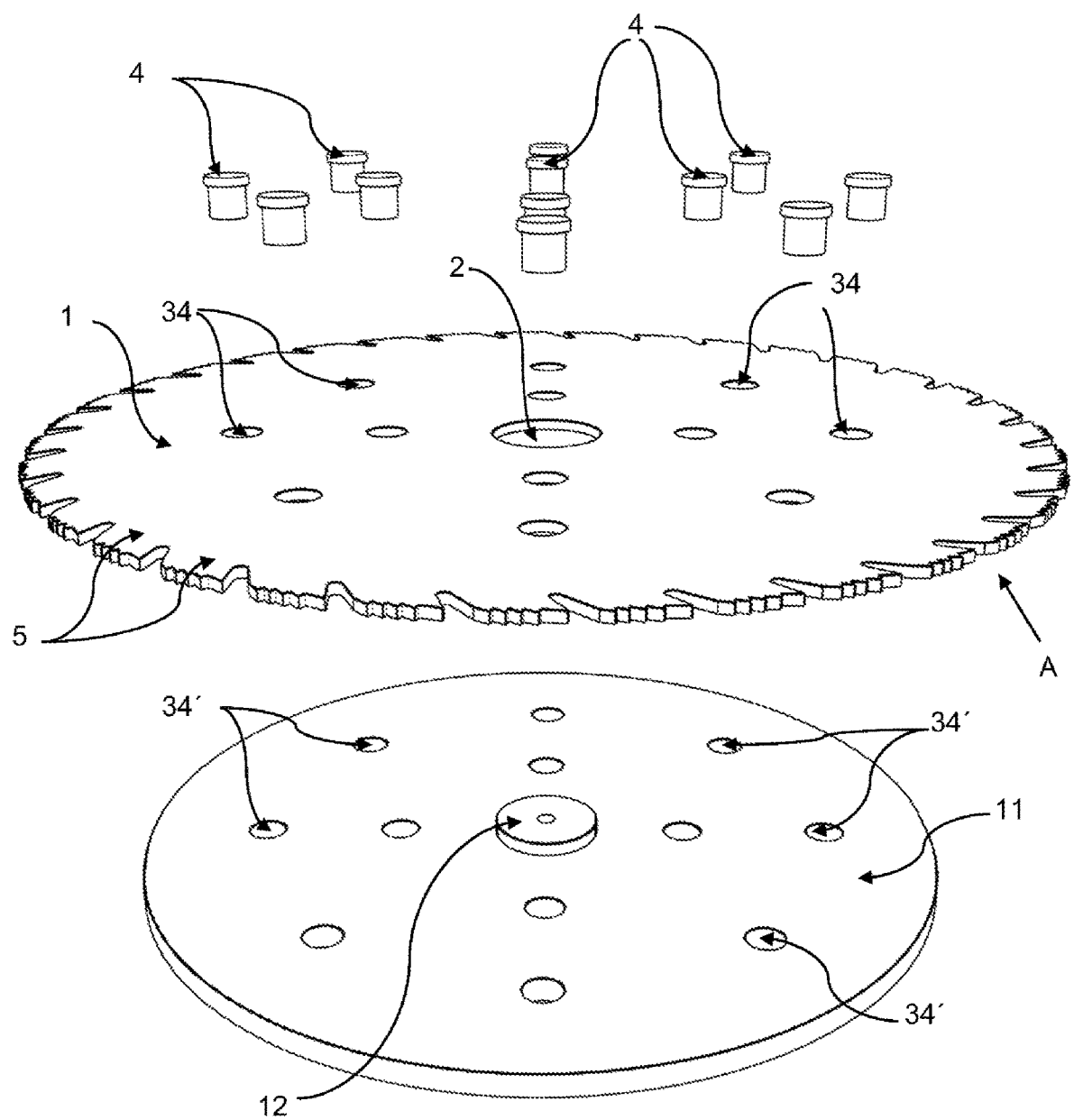
FIG. 3 is a conventional perspective view of the circular blade and a support disk that supports the circular blade.

Between every two notches (3) a section, portion, or protrusion (5) was formed, resulting in a total of 35 sections, portions, or protrusions (5); to which, a series of 5 teeth (6, 7, 8, 9, and 10) are machined on their peripheral edges; where the tips of these teeth had an angulation of 53, 71, 76, 54, and 73°, respectively; and between tooth (6) and (7) the angle was 88°, between tooth (7) and (8) the angle was 79°, between tooth (8) and (9) the angle was 59°, and between tooth (9) and (10) the angle was 74°, see FIG. 2. With these series of teeth, more efficient and finer cuts of ice have been achieved, producing fewer frost or ice fragments, as conventional blades do.

In this example, 12 holes were strategically machined into the blade (34) throughout the entire area of the circular blade, to allow for the press-fitted insertion of a connecting bolt (4), into each hole (34).

Example 2. Device for Cutting Ice Tubes, with a Single Circular Blade

An ice tube cutting equipment was manufactured, which included, a circular blade (A) with 35 toothed sections or protrusions (5), as described in example 1.

A metallic support disk (11) provides support and stability to the circular blade (A), for this reason, the support disk (11) has in the center of its upper face a circular protrusion (12), which was pressed in and housed in the hole (2) of the circular blade (A), to make a secure and strong union between both pieces (A and 11). The diameter of the support disk (11) is 38.10 cm, 16 cm smaller than the diameter of the blade (A), in such a way, that there is a free space of 8 cm below the perimeter of the circular blade (A), enough space to ensure the toothed sections (5) can achieve a full cut of the ice tube (71) (see FIG. 4); in this specific example, the diameter of the support disk (11) was 38.10 cm but its diameter can vary, as long as enough space is left for the toothed protrusions (5) to make their complete cut. The support disk (11) was also equipped with 12 holes (34'), whose distribution was exactly the same as the holes (34) of the blade (A), with the purpose that the lower ends of the connecting bolts (4), that pass through the holes (34) of the blade (A), align with and are press-fitted into the holes (34') of the support disk (11); in this way, the circular blade (A) and the support disk (11) were securely joined, collectively supporting a rotary movement exceeding 1000 rpm without detaching.

It should be noted that there are alternative methods to join the circular blade (A) and the support disk (11) that are already recognized in the state of the art.

Figure 4:
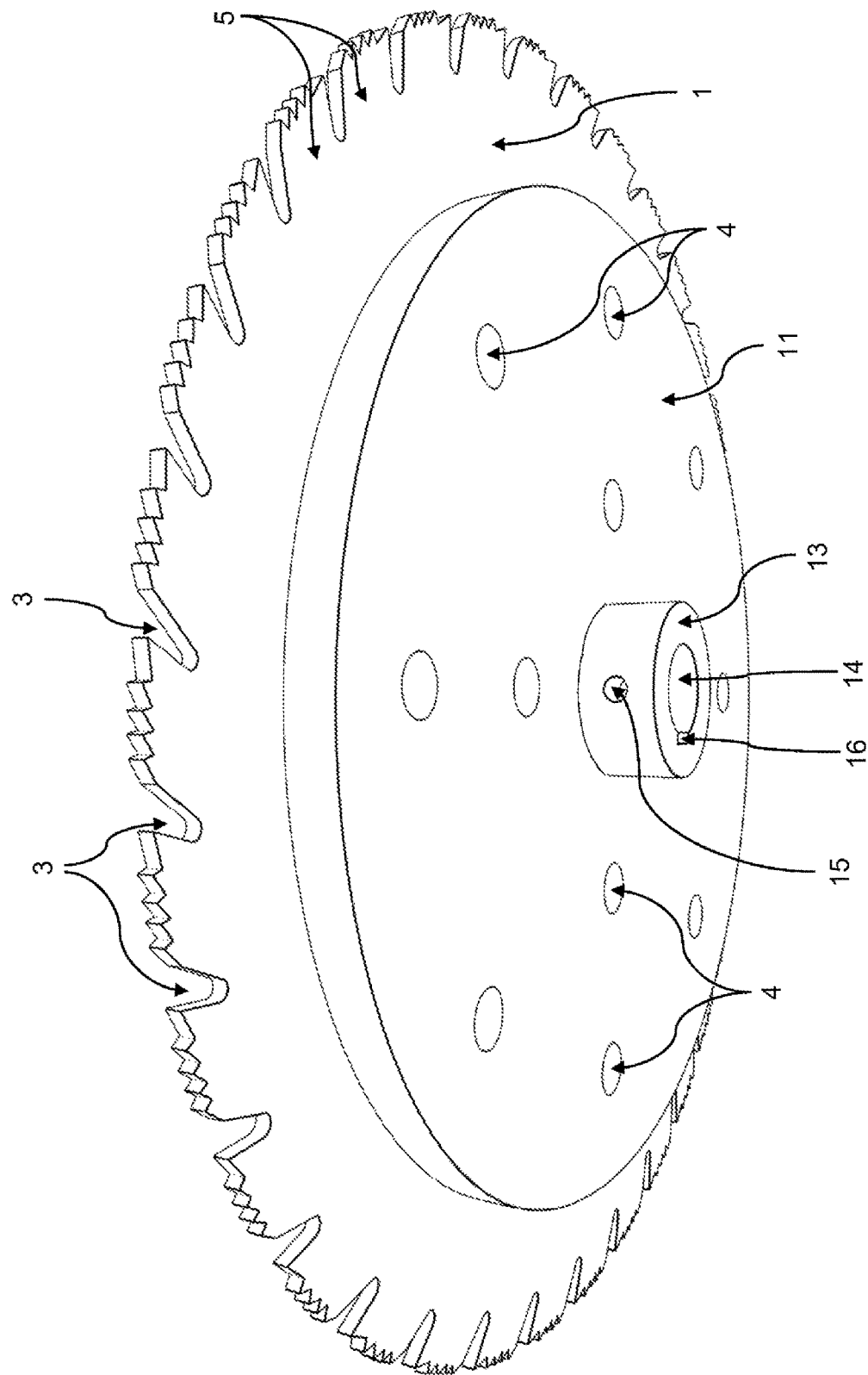
FIG. 4 is a conventional bottom perspective view of the circular blade and the support disk, already joined together.

This support disc (11) was provided at the center of its lower face with a circular bush (13) that has a circular cavity (14), to connect to an element of a transmission system; therefore, said bush (13) was equipped with, at least, two lateral holes (15) and an internal radial groove (16), for the insertion of a fastening element that will unite the disk (11) with the element of the transmission system, see FIG. 4.

Figure 5:
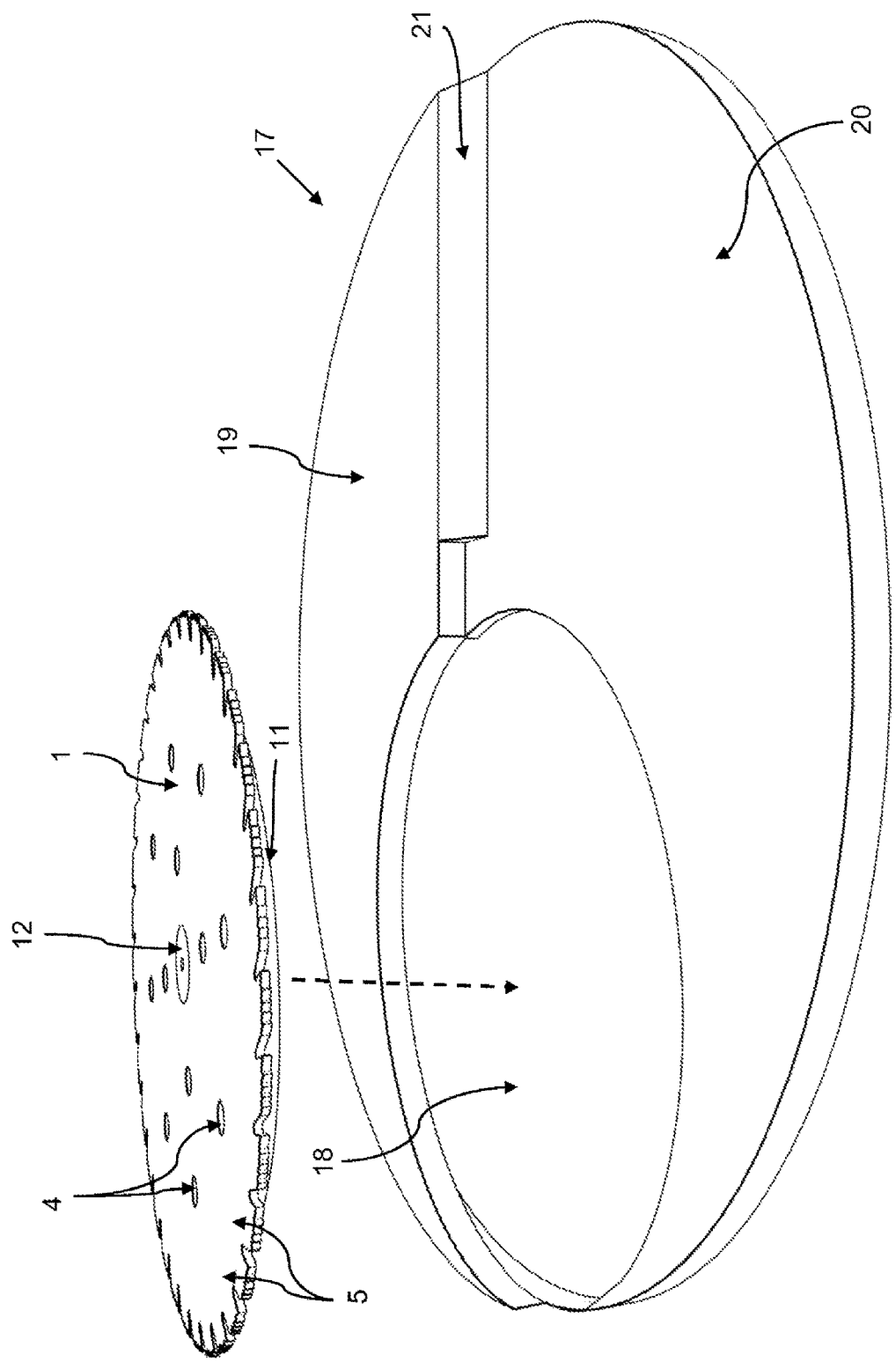
FIG. 5 is a conventional perspective view of a cutting indicator platform, which engages with the circular blade supported by the support disk.
Figure 6:
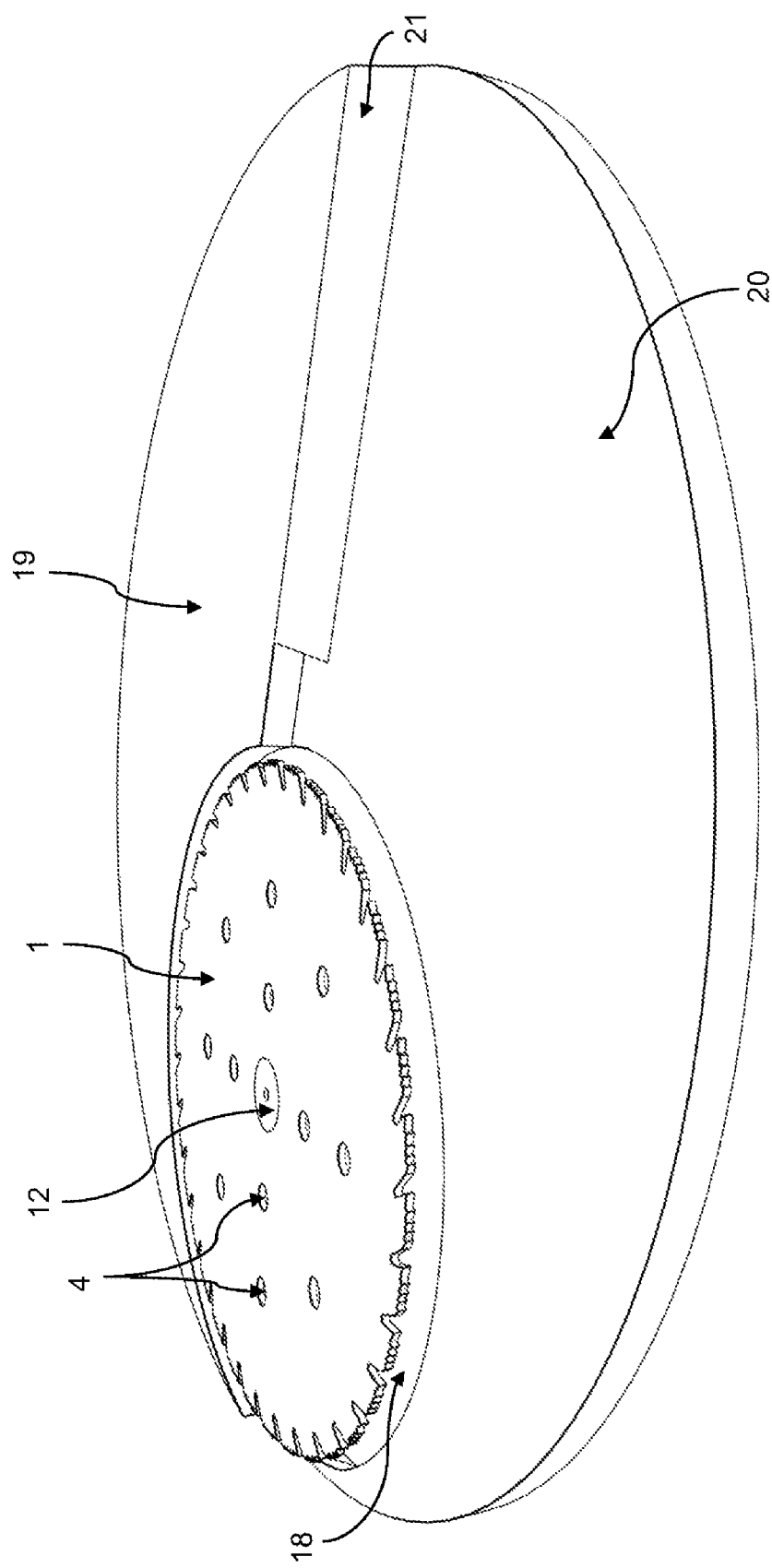
FIG. 6 is a conventional perspective view of the cutting indicator platform, depicted in the previous figure, but when assembled with the circular blade and the support disk.
Figure 7:
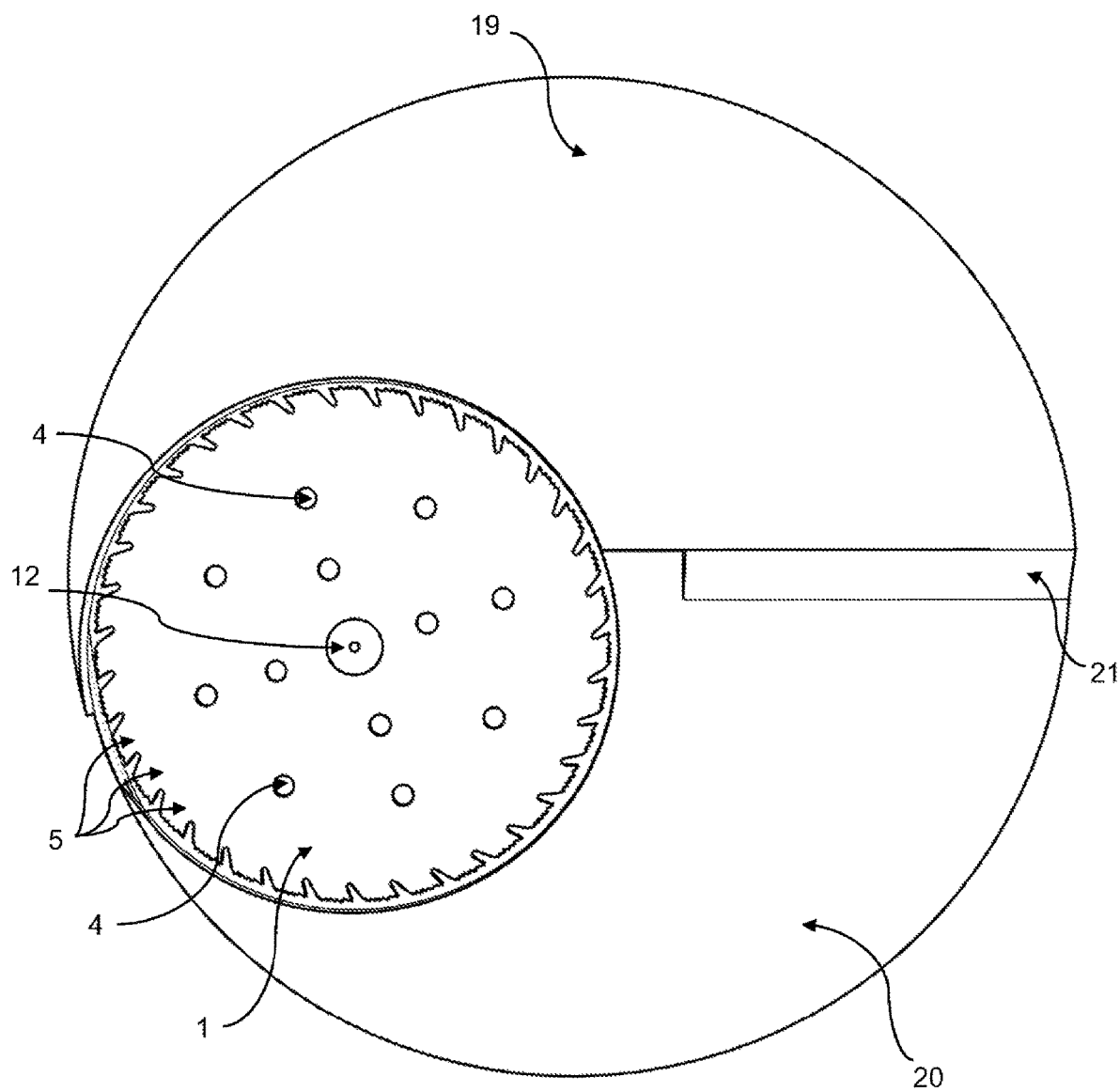
FIG. 7 is a top plan view of the previous figure.

A cutting indicator platform (17) is provided to functionally engage with the circular blade (A) already mounted on the support disk (11), FIG. 5; thus, said platform (17) has a hole (18) located from its central point towards a peripheral point, where said hole (18) has sufficient dimensions to house the circular blade (A) and at the same time allow it to have a rotational spin. The cutting indicator platform (17) is designed with two levels, where one half is substantially elevated (19), in comparison with the other half (20), this unevenness or step (21) determines the cutting length of the ice, which in this case measures 4 cm in height; therefore, the blade (A) is positioned at the height level of the raised half (19). The step (21), which results from the different heights of the platform's halves (17), had an inclination of 45° with respect to the horizontal plane of said halves (19 and 20), to prevent damage to the ice tubes (71) as they fall onto the lower half (20) of the platform (17); and with the inclined step (21) they slide down to the platform (20), thus avoiding chipping, shattering, breaking, etc. or any other damage affecting the good quality of the ice tubes. In this example, the inclination of the step (21) was 90% of the length of said step, leaving the section of the step (21) adjacent to the orifice (18) without inclination, so as not to interfere with the circular blade (A) during the cutting process of the ice tubes (71).

Figure 9:
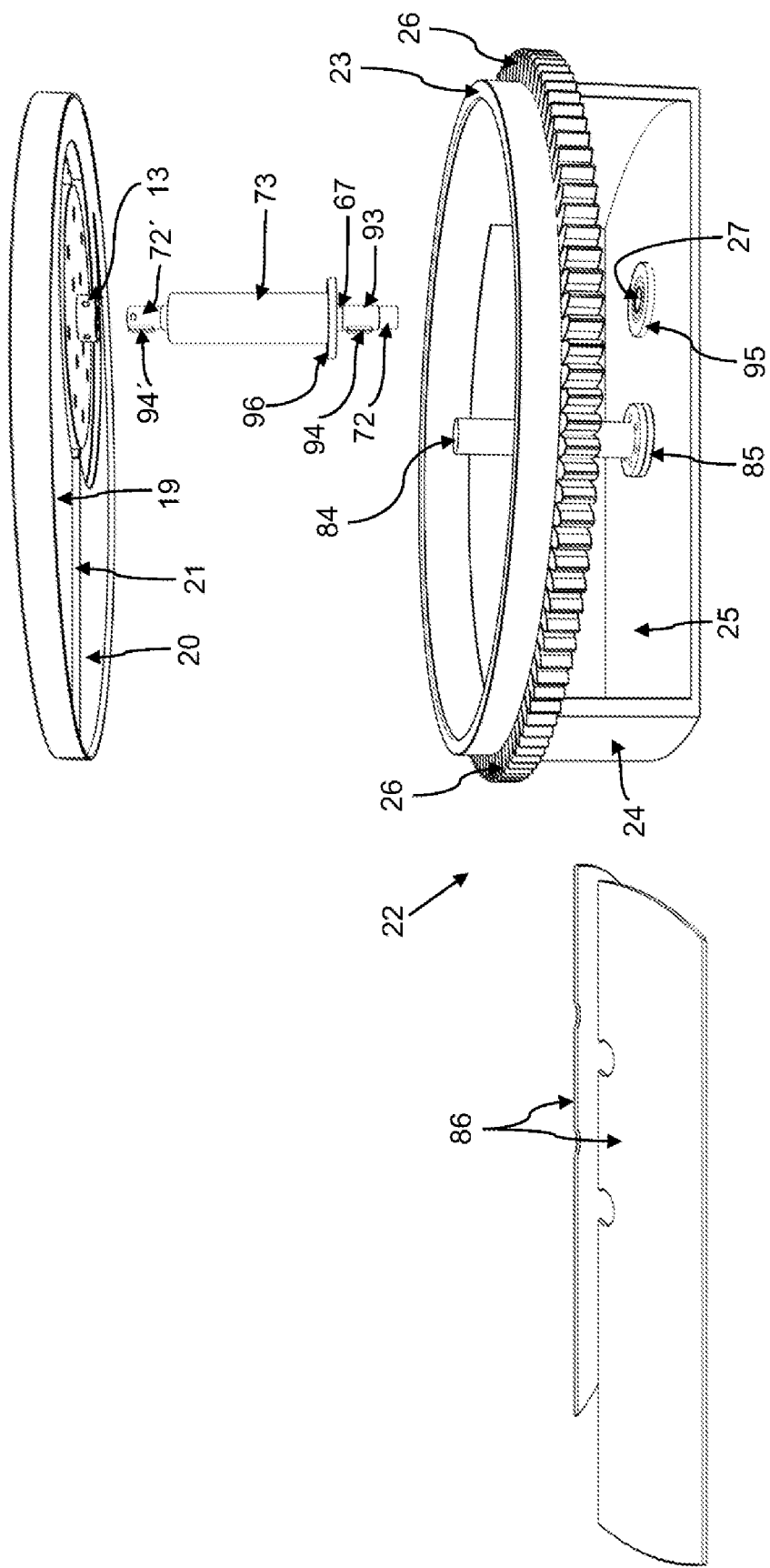
FIG. 9 is a conventional perspective view of a circular container that supports the cutting indicator platform, to the support disk that in turn supports the circular blade.
Figure 10:
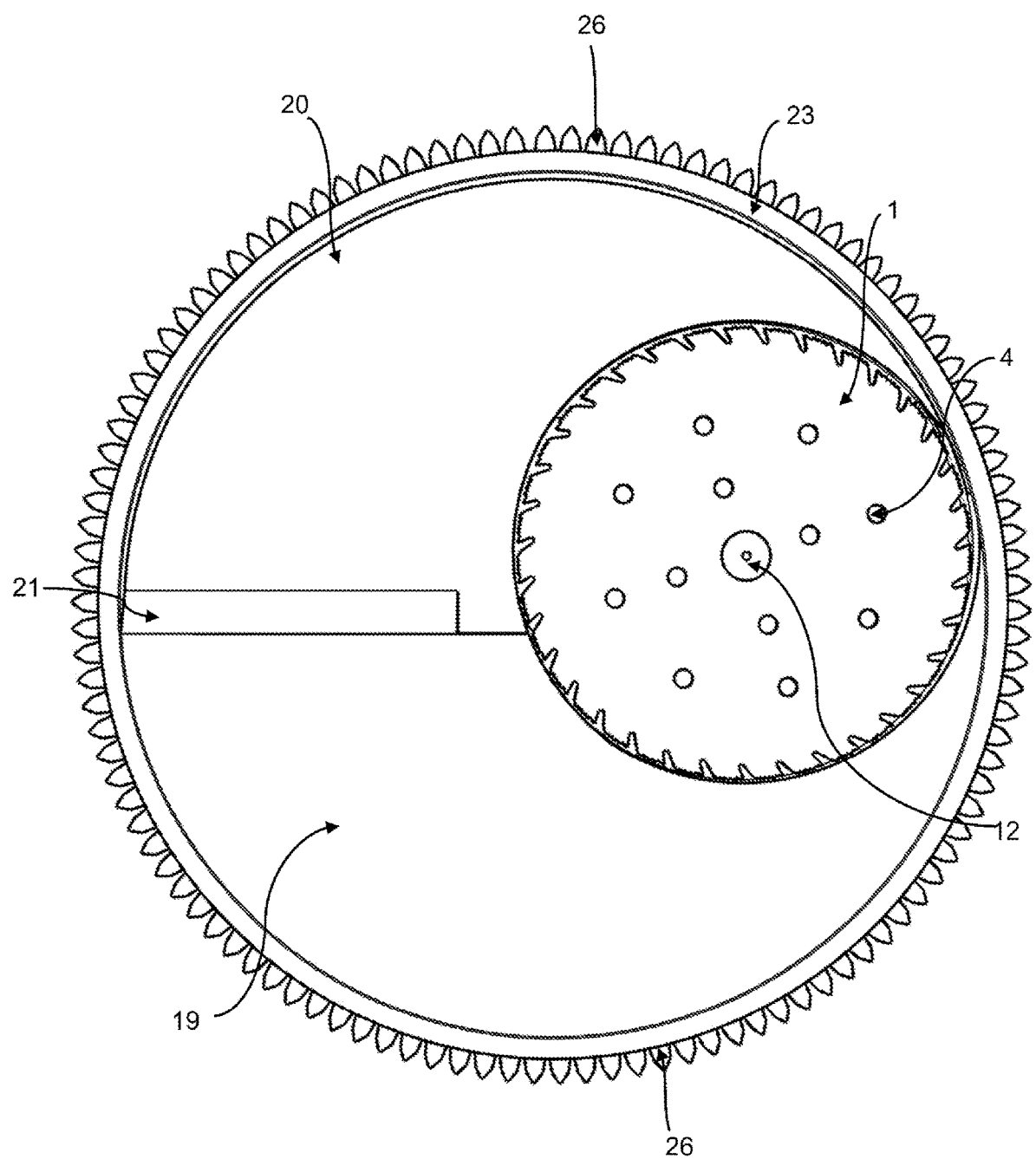
FIG. 10 is a top plan view of the previous figure, in an assembled condition.

A circular container (22) is provided to house and internally support the assembly integrated by the platform (17), the support disk (11), and the circular blade (A); where said circular container (22) is open at its top, at its sides opposite each other, and at the bottom sections adjacent to these lateral sides (see FIG. 9); thereby forming an upper smooth ring (23), and a lower rectangular section made up of the parts of the lateral sides (24) and the base (25) that remained. An external toothed belt (26) was provided towards the upper smooth ring (23); and a hole (27) was provided in the base (25), located between the central point and a peripheral point of said base (25), and a flange (95) was provided within the hole (27).

Figure 11:
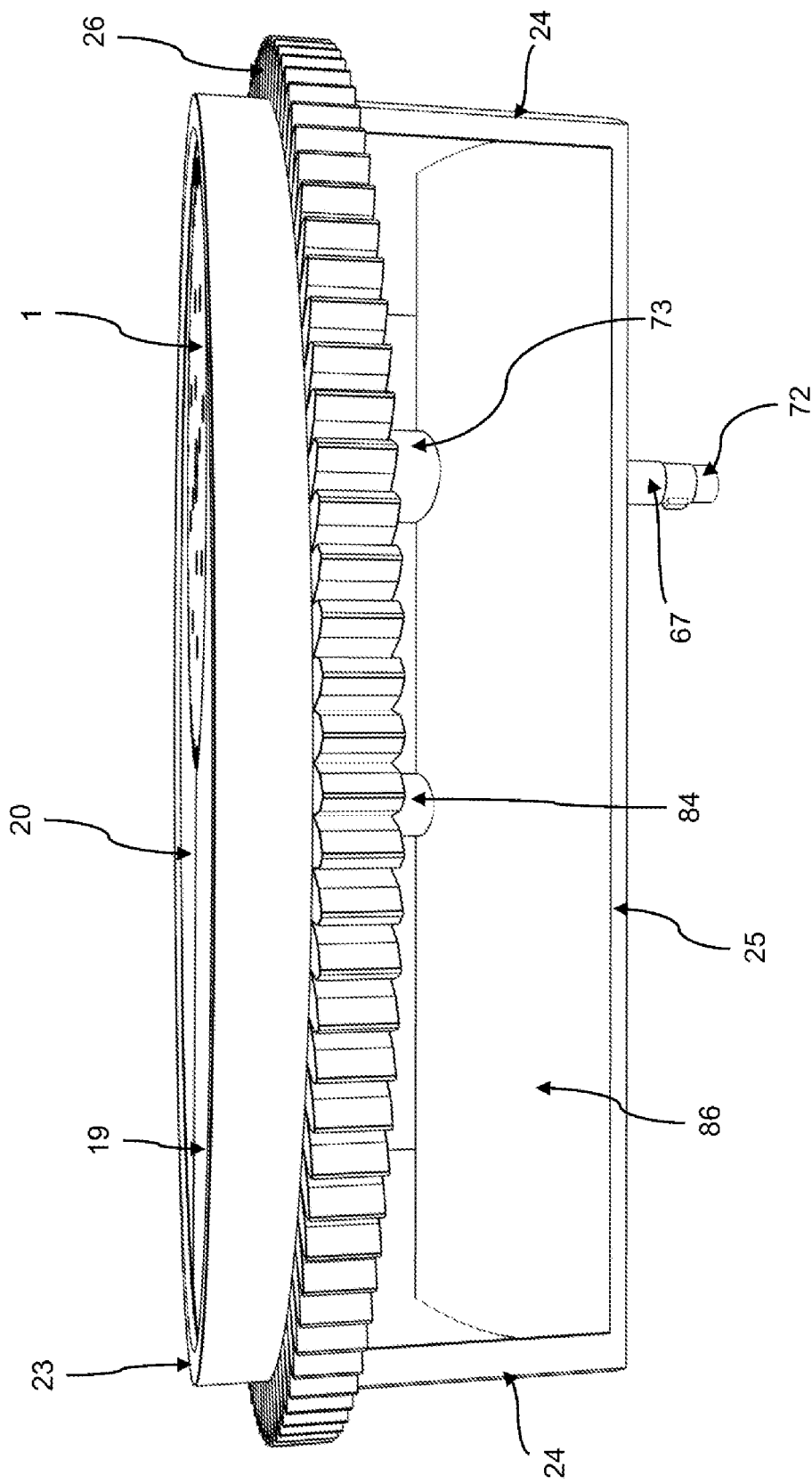
FIG. 11 is a conventional perspective view of FIG. 9, in an assembled condition.

To said circular container (22) a central support (84) was added to provide support to the cutting indicator platform (17) beneath its central point, in such a way that said platform (17) will not sag under the weight of the ice tubes; for this purpose, said support (84) was fixed vertically to the central point of the base (25) using flanges (85). On the base (25) a sawhorse structure (86) was affixed (FIG. 11), with the purpose of facilitating the sliding of cut ice tube pieces, fragments, and/or ice slush or water, towards the bottom of the cutting device.

The cutting indicator platform (17) is press-fitted into the upper part of the circular container (22), aligning with the height of the smooth ring (23).

Figure 12:
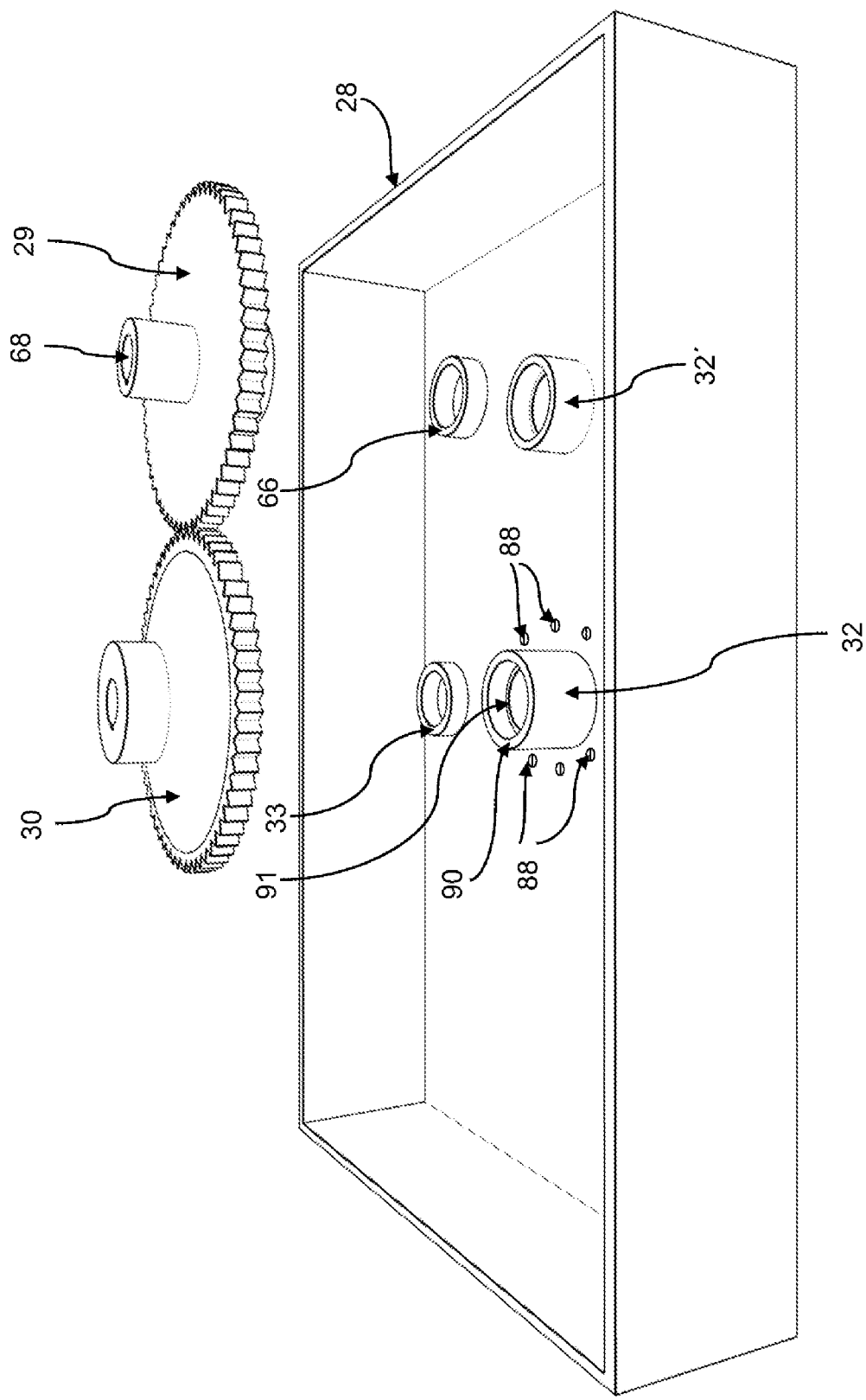
FIG. 12 is an exploded perspective view of the components of a transmission box.
Figure 13:
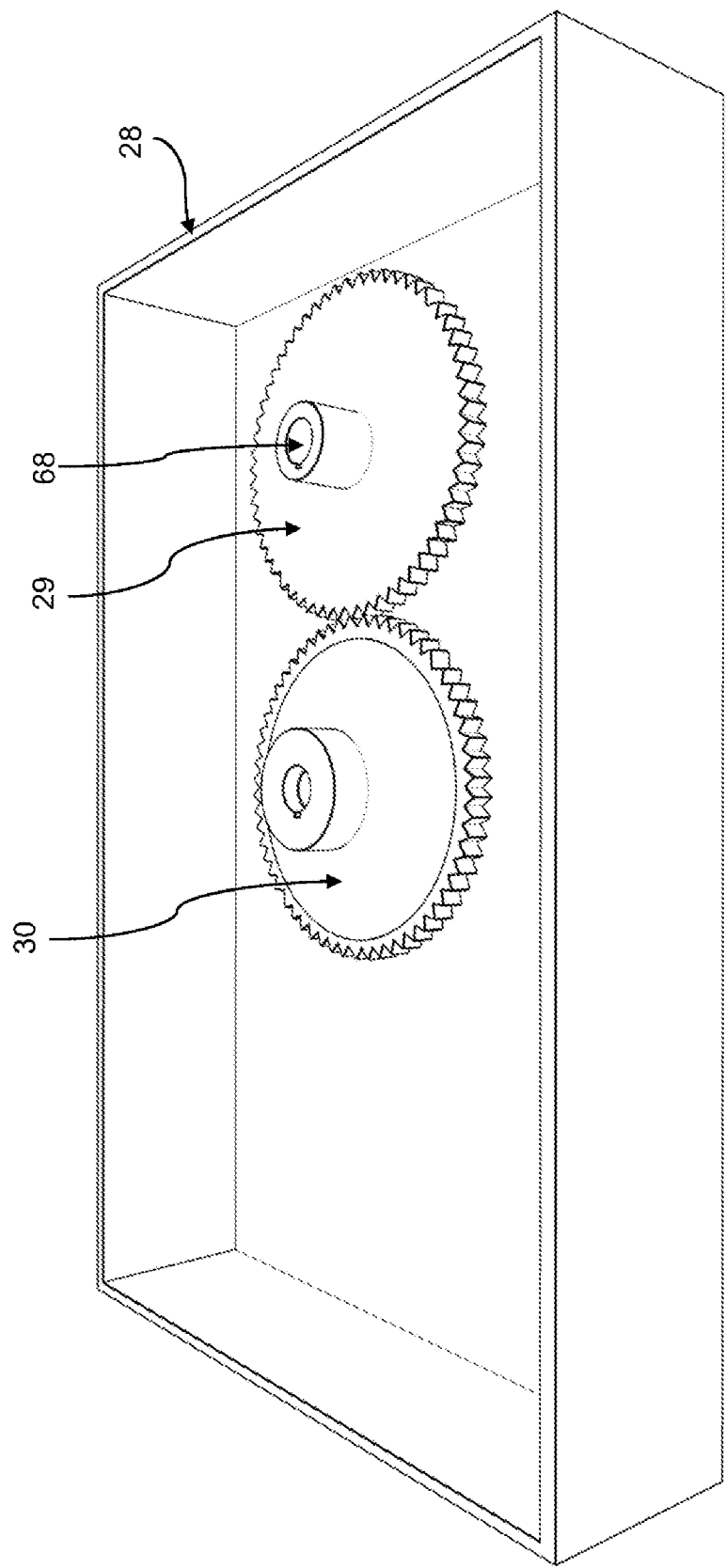
FIG. 13 is a conventional perspective view of the transmission box in its an assembled condition.
Figure 14:
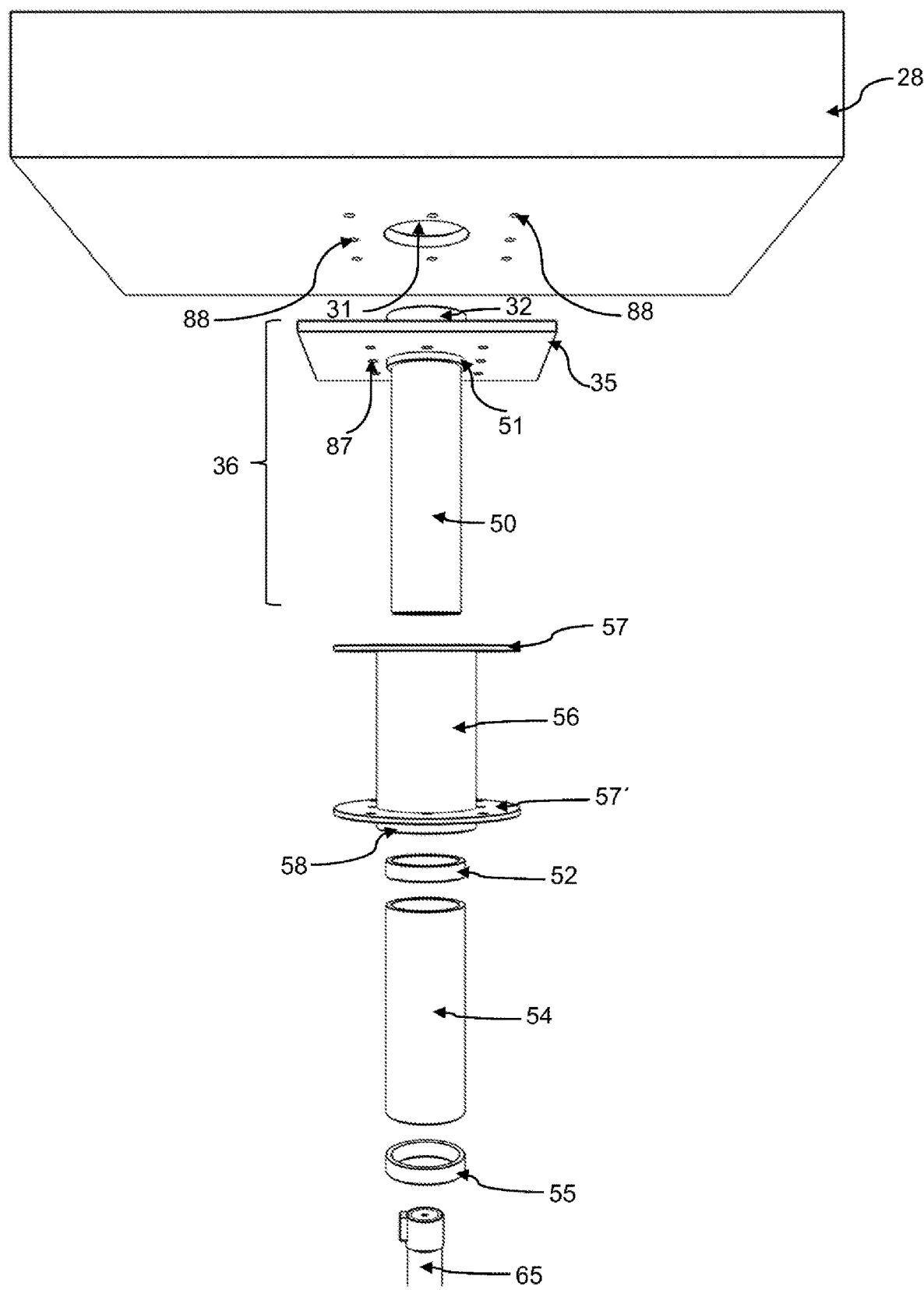
FIG. 14 is a bottom perspective view of the transmission box, where the inclusion of some connecting elements is observed.
Figure 15:
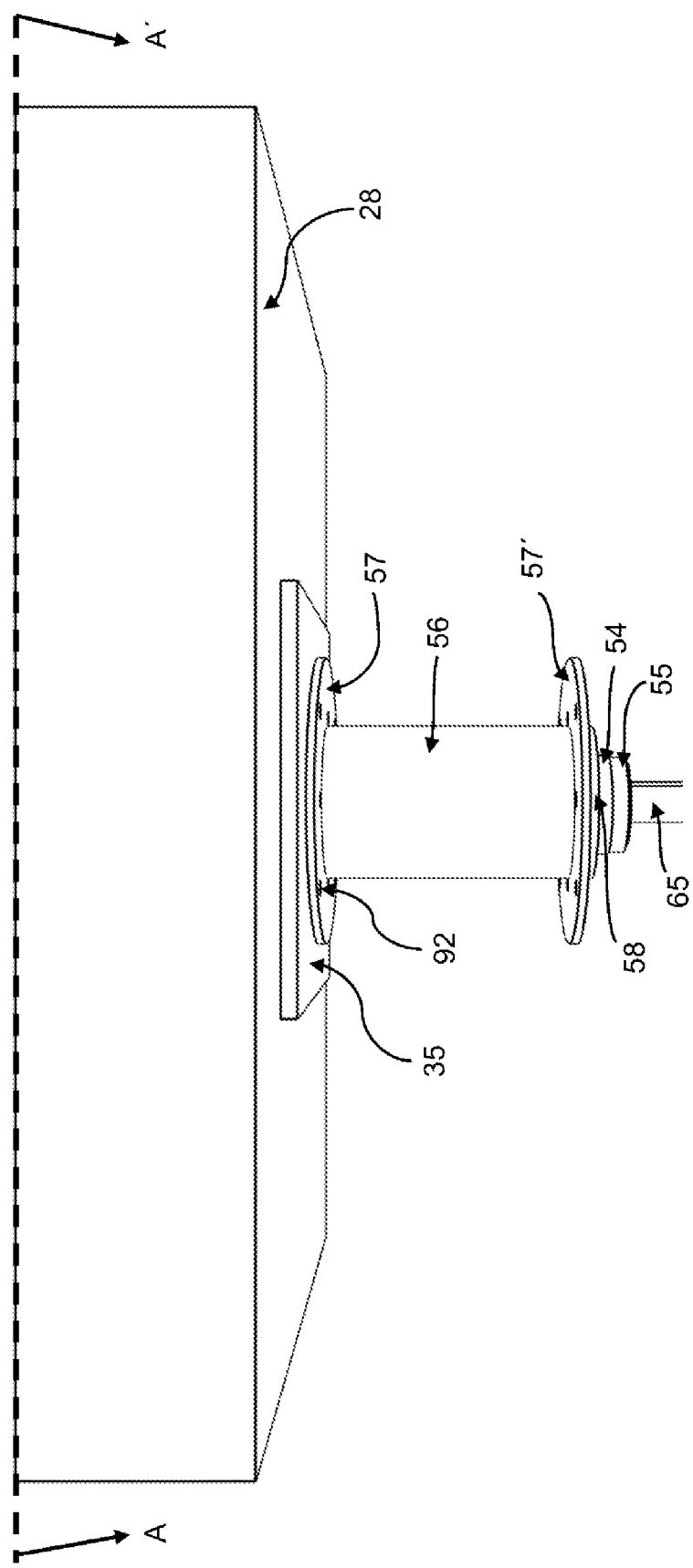
FIG. 15 is a conventional perspective view of the previous figure, in an assembled condition.
Figure 16:
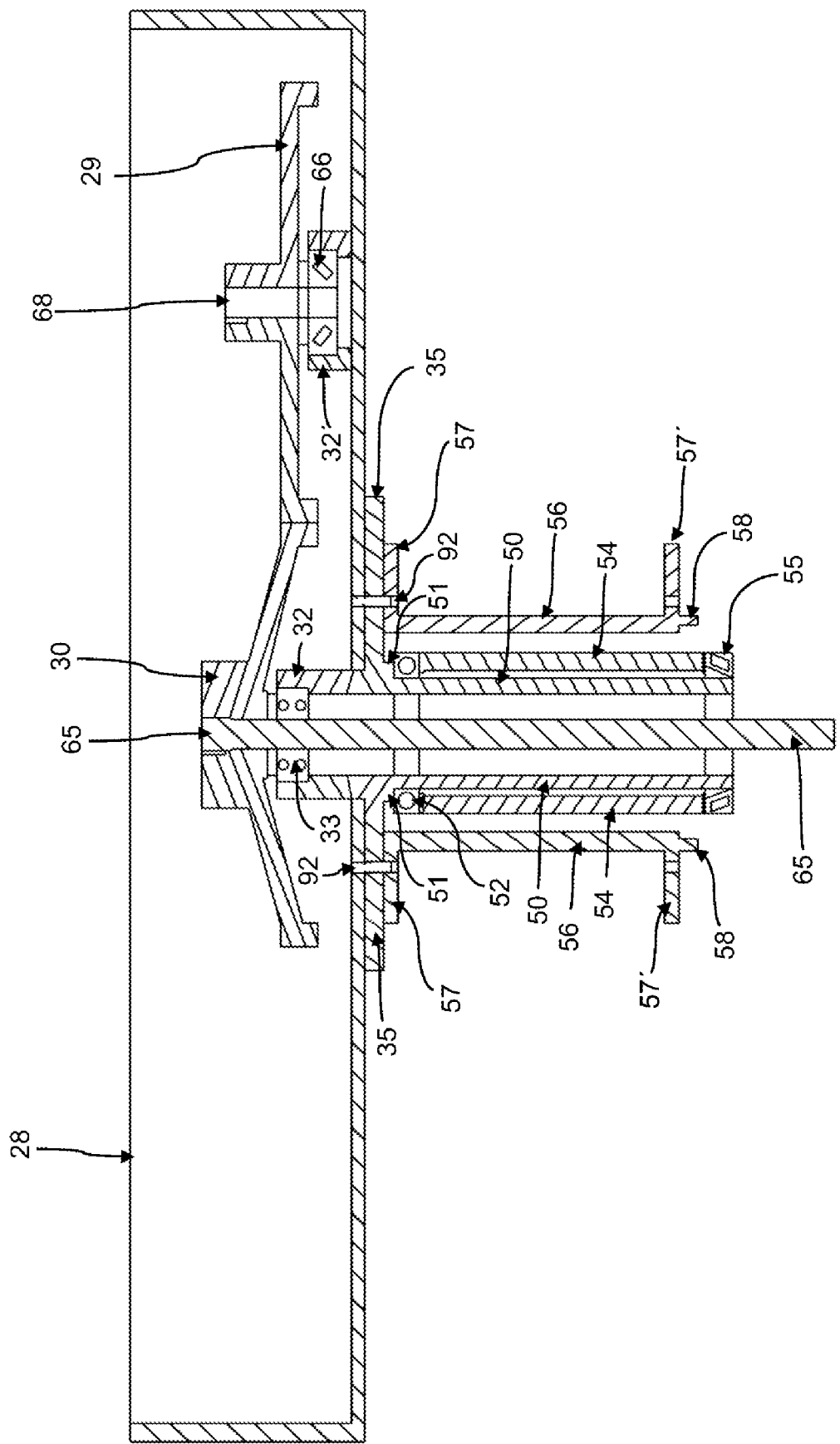
FIG. 16 is a sagittal cut A-A' of the assembled arrangement of the previous figure.
Figure 17:
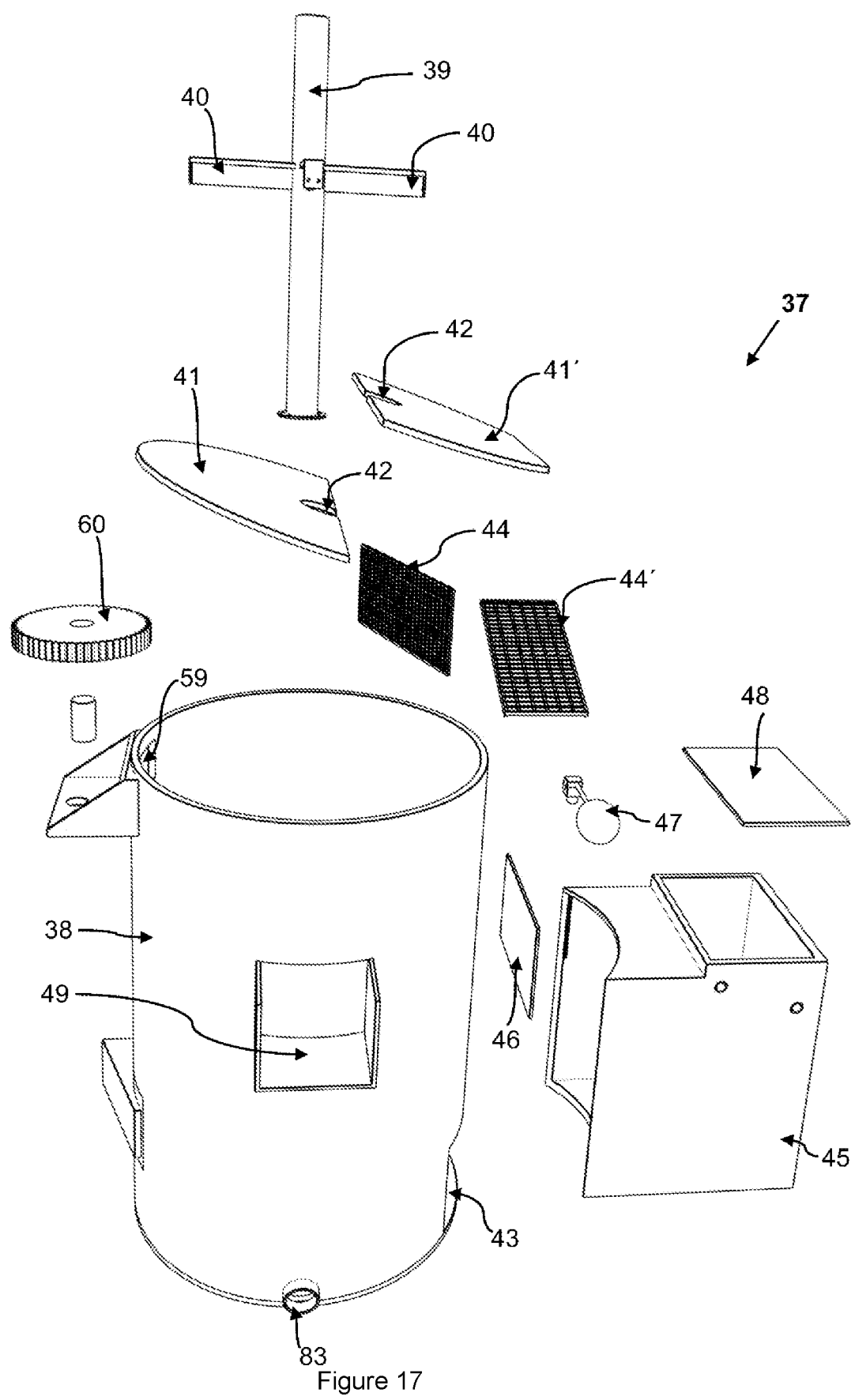
FIG. 17 is an exploded perspective view of the components of a container that is part of the ice tube cutting equipment of the present invention.
Figure 18:
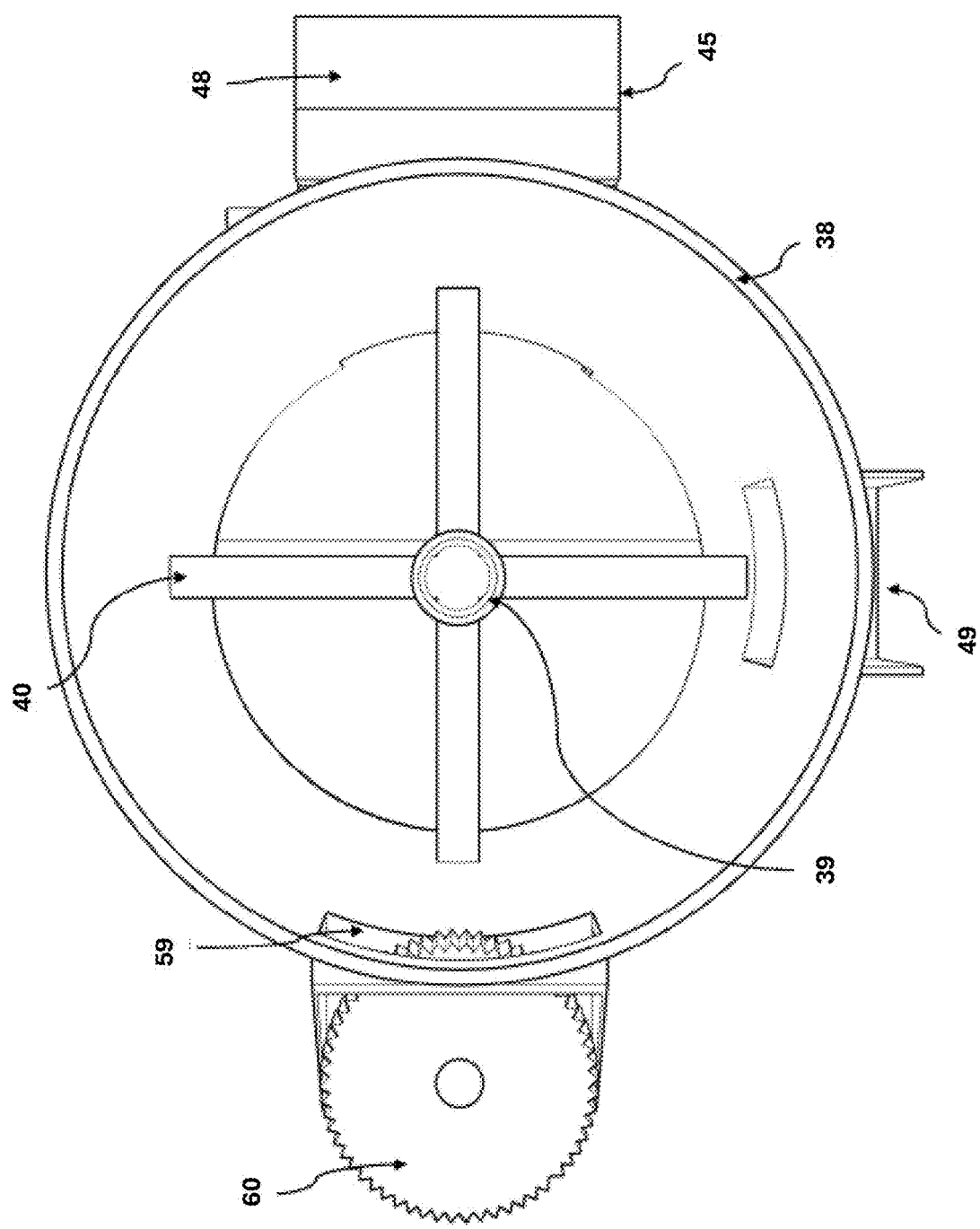
FIG. 18 is a top plan view of the container from the previous figure, in an assembled condition.
Figure 19:
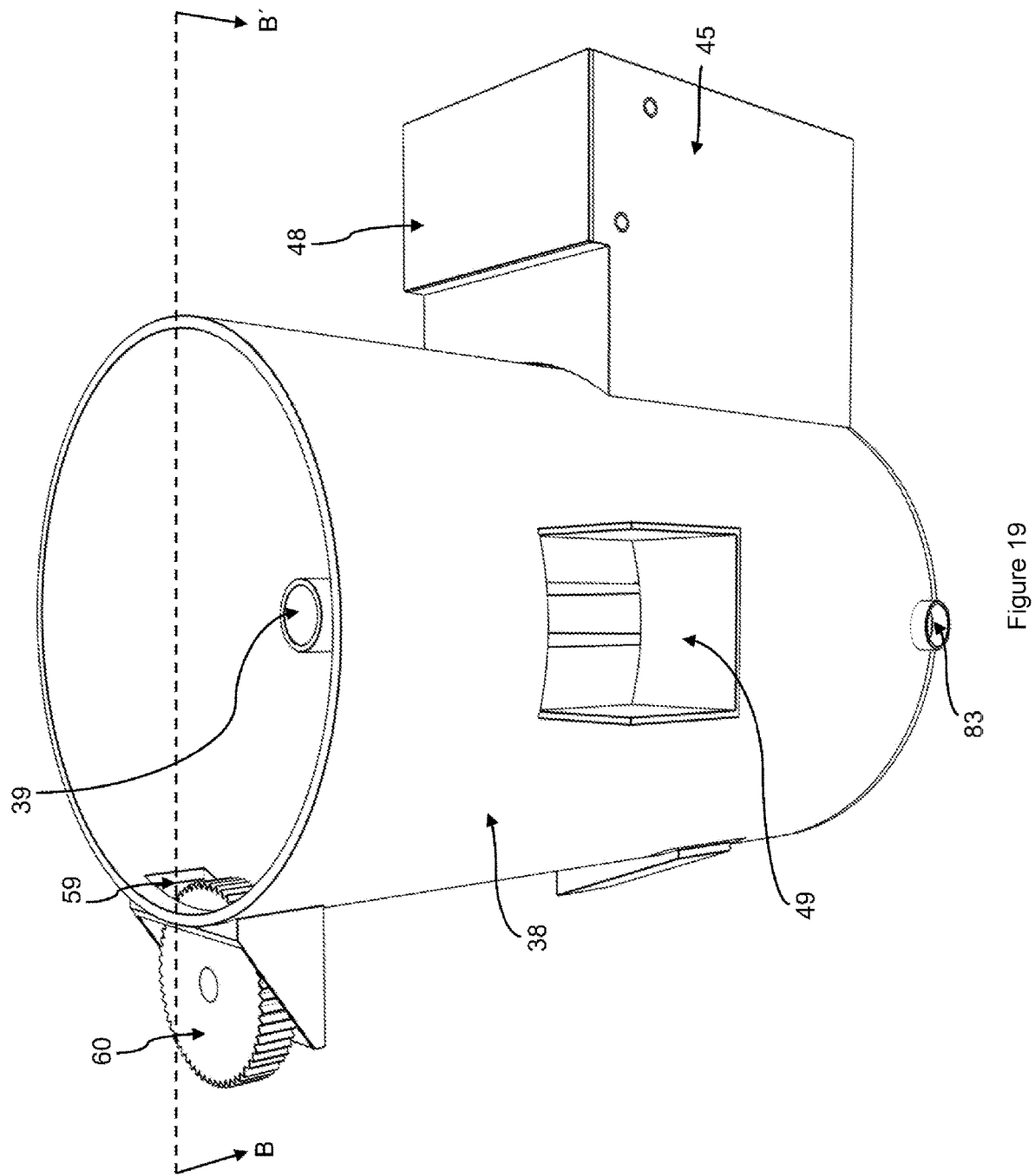
FIG. 19 is a conventional perspective view of the container in its assembled condition.
Figure 20:
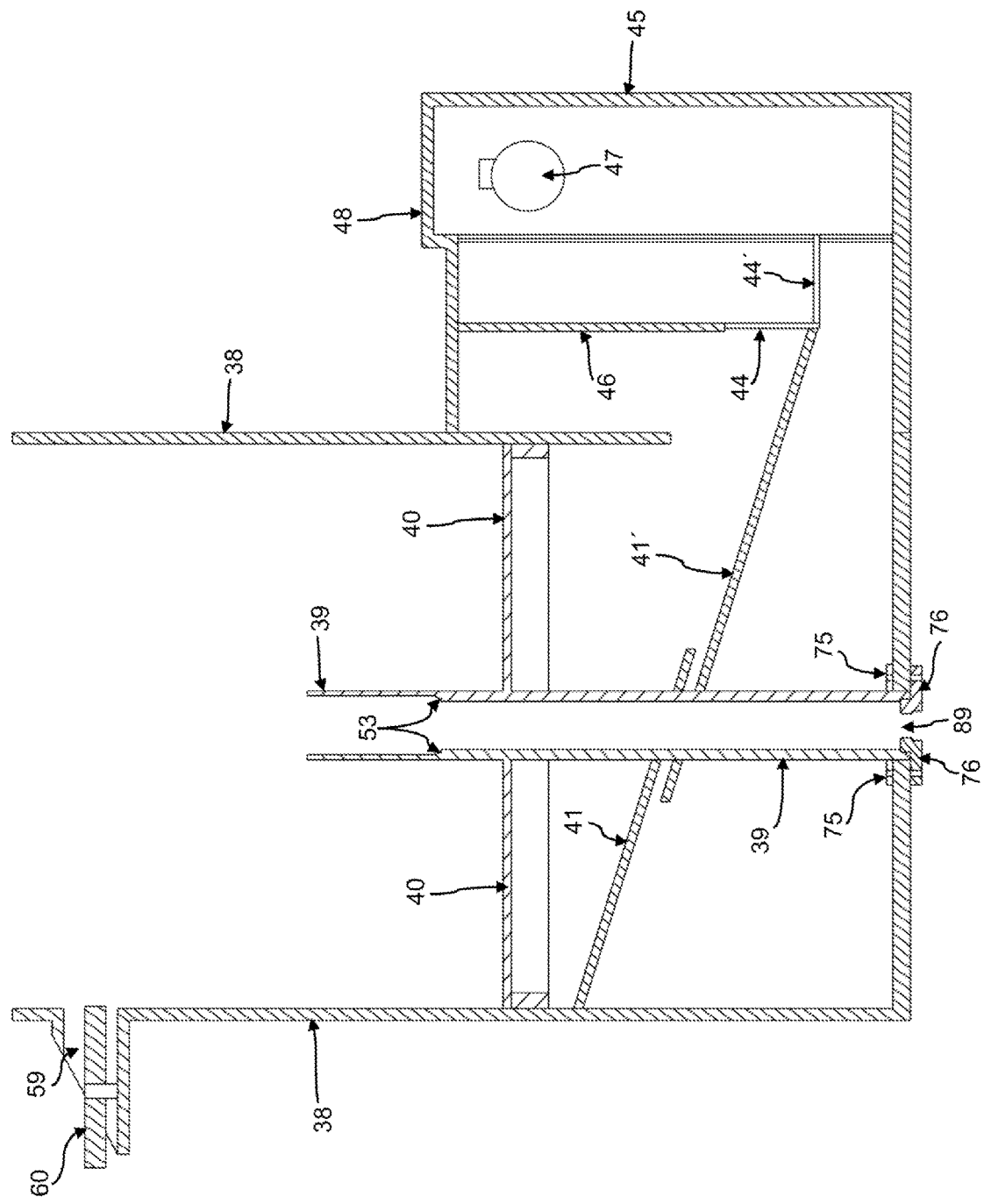
FIG. 20 is a sagittal cut B-B' of the container in its assembled condition.

A transmission box (28) was externally affixed to the bottom of the base (25) of the circular container (22), see FIGS. 12 and 13; where said transmission box (28) comprised within it a pair of transmission gears, one central (30) and the other adjacent (29). The transmission box (28) also comprised a central hole (31), see FIG. 14.

The ice tube cutting equipment comprises a container (37) designed to house, support, and protect the internal components of the equipment. With respect to FIGS. 17-20, the container (37) consists of a cylindrical tank (38) sealed at its bottom end, but with a central hole (89), and open at its top end. A tubular support jacket (39) open at both ends, was vertically affixed within the cylindrical tank (38); where the lower end of this support jacket (39) is inserted into the central hole (89) of the cylindrical tank (38); and to firmly anchor the support jacket (39), a flange (75) and a plug-plate (76) were used, where the flange (75) was situated inside and atop the base of the cylindrical tank (38), but snugly surrounding a section of the jacket's (39) lower end, meanwhile, the plug-plate (76) is externally bolted to the base of the cylindrical tank (38) and paired with the interior flange (75), see FIG. 23, where this plug-plate has a central hole to allow the passage of a transmission element. Inside the support jacket (39) and atop the internal side of the plug-plate, a bearing cup (74) was affixed, in which a lower bearing (77) was placed to assist the rotary movement of the transmission element. On the bottom part of the plug-plate (76) a journal bearing (78) was screwed so that its bearing also aids the rotational movement of the transmission element.

Four shafts (40) were provided to grant more vertical stability to the support jacket (39), said shafts were fixed horizontally between the support jacket (39) and the internal walls of the cylindrical tank (38), in the shape of a cross. A ramp to channel frost and ice fragments was incorporated below the shafts (40), in this case the ramp was constructed from two sheets (41 and 41'), whose dimensions and configurations are sufficient for their edges to seal against the internal wall of the cylindrical tank (38), and a hole (42) is provided in each sheet (41 and 41'), through which the support jacket (39) passes; both sheets were affixed at a 45° angle relative to the vertical axis of the cylindrical tank (38) in a complementary manner, with one sheet (41) positioned above and the other below (41'), overlapping at the point where the support jacket (39) passes through, see FIG. 20. It should be noted that the holes (42) must be well sealed to the external walls of the support jacket (39), once it is placed or passes through these holes (42), in order to prevent the frost and/or ice pieces from falling to the bottom of the cylindrical tank (38), which also includes a lower lateral hole (43) through which the frost, ice pieces, and water are conducted out of the cylindrical tank (38); therefore, a first strainer (44) was placed vertically at the lower end of the bottom sheet (41') and in front of the lower lateral hole (43), to stop the frost and/or ice pieces resulting from the cutting of the circular blade (A); and externally and horizontally, a second strainer (44') was affixed at the point where the lower edge of the bottom sheet (41') and the lower edge of the first strainer (44) converge, so that the frost and ice pieces that are not retained by the vertical strainer (44), are retained by the horizontal strainer (44').

The container (38) is provided with a collection tank (45) to collect frost, ice fragments, and water originating from the cutting section, thus, the collection tank (45) is positioned at the lower lateral hole (43) of the cylindrical tank (38), where the ramp formed by the sheets (41) and (41') discharges and said solid materials are then retained by the strainers (44) and (44') until they melt. A dividing wall (46) was vertically positioned over the vertical strainer (44) to prevent the passage of frost and ice fragments in the event of an overflow. Therefore, said collection tank includes a water source, which is a valve with a float (47) to interrupt the water flow once the water level in the collection tank (45) has reached its limit; where the water that comes from the water source, helps to melt the frost and ice pieces that are discharged in the strainers (44 and 44'), by having a higher temperature; and a cap (48) was provided to cover the top part of the collection tank (45)

After the temperature exchange, resulting from the melting of the frost and ice pieces, low-temperature water is obtained, which can pass freely through the stainless steel meshes (44 and 44') towards the recirculation water pump of the refrigeration system, for its use as a product by reducing the loss of the by-product and energy utilization.

The cylindrical tank (38) was equipped with a lower outlet (83) to connect a conventional water pump motor (not illustrated) for the recirculation of water to the ice-making refrigeration unit. It was also provided with a lateral outlet (49) for the exit of the cut ice pieces; and it also included an upper lateral hole (59) where an external gear (60) was adapted, which engages with the toothed belt (26) of the circular container (22).

To functionally connect the assembly of components formed by: the blade (A), the metallic support disk (11), the cutting indicator platform (17), the circular container (22), and the transmission box (28); to the support jacket (39) of the container (37); a tubular connecting piece (36) was machined, which was formed of a vertically arranged tubular body with open ends, and an external plate (35) that encircles the tubular body perpendicularly, and it is located towards the upper end of the tubular body at a ⅔ position relative to the lower end of said tubular body; resulting in two distinct sections of the tubular body, an upper section (32) and a lower section (50), where the upper section (32) is shorter and has a larger diameter compared to the length and diameter of the lower section (50).

The upper section (32) was inserted through the hole (31) of the transmission box (28), and the external plate (35) was externally screwed to the base of said transmission box (28); in this case, both the plate (35) and the base of the transmission box (28) were strategically equipped with 8 holes (87) and (88), respectively, for the insertion of connecting bolts (92) to securely join and fasten both components. In this way, the upper section (32) was fixed inside the transmission box (28), and the interior of said upper section (32) was machined with a stop (90) on its upper edge and a step (91) at its base, to create sufficient space to safely house a bearing (33), which supported and provided the rotary motion to the central transmission gear (30).

Figure 23:
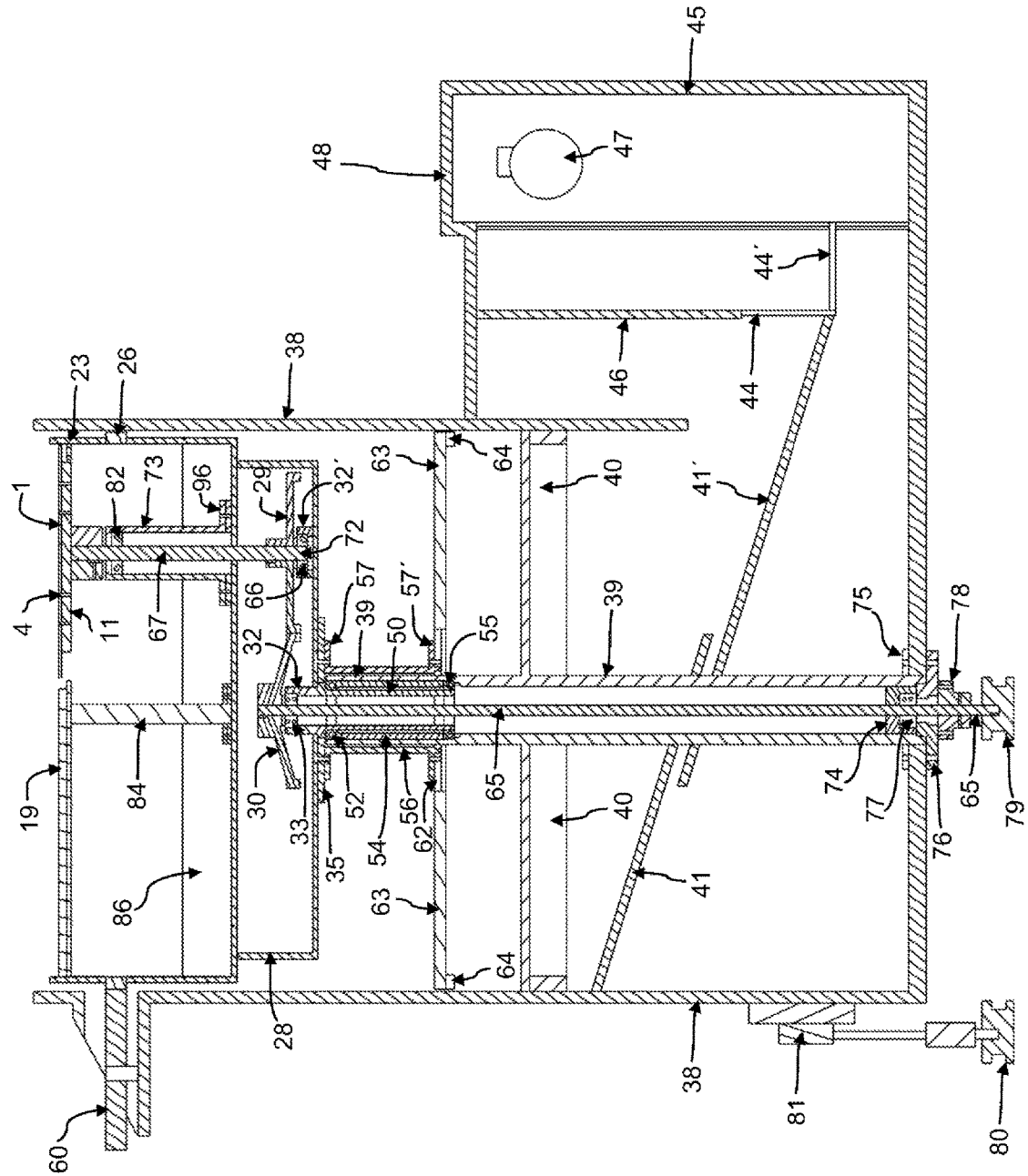
FIG. 23 is a sagittal cut C-C' of the ice tube cutting equipment, where the interaction and assembly of the internal components of the equipment for cutting tube ice can be observed, according to the present invention.
Figure 24:
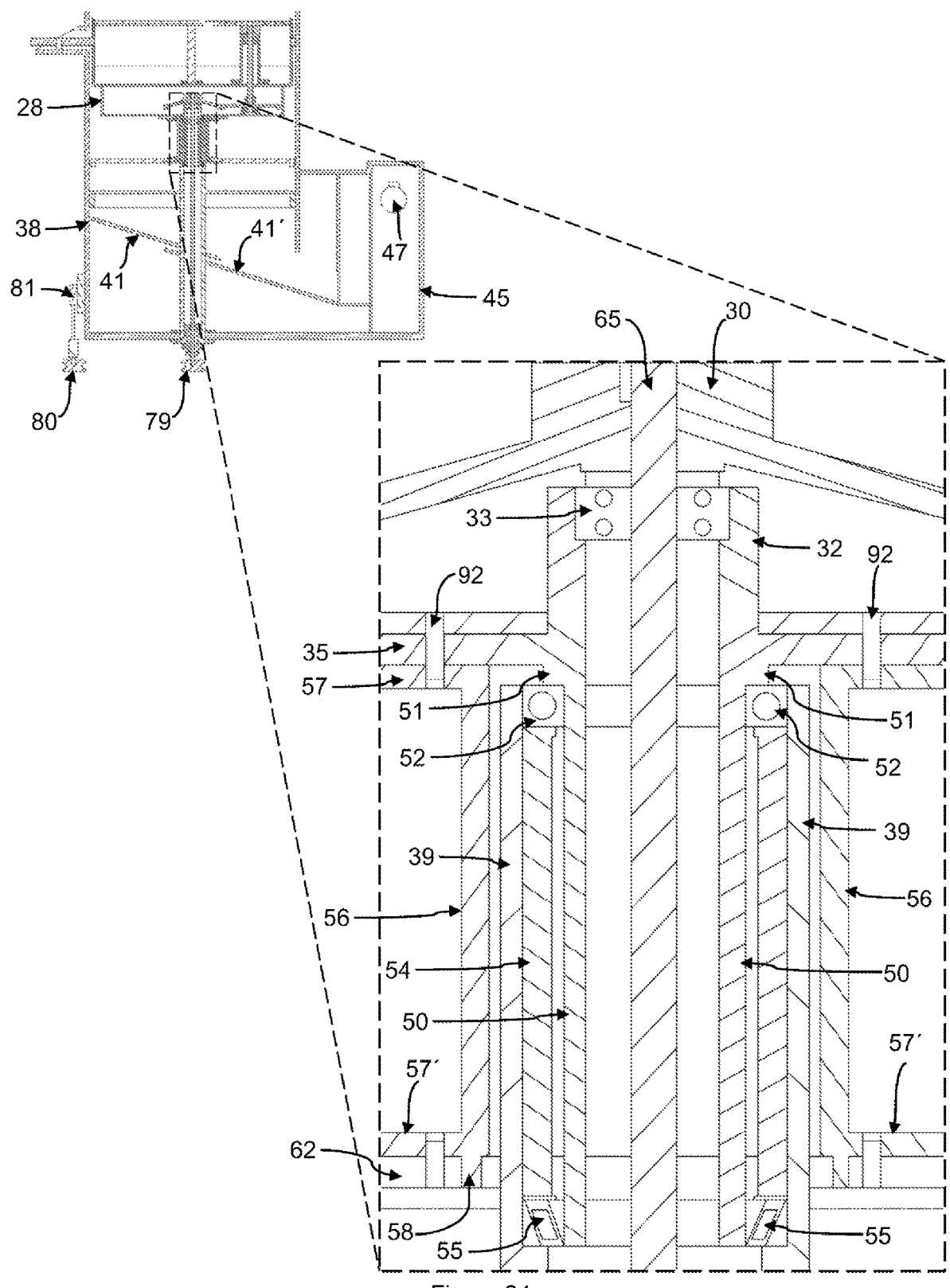
FIG. 24 is a close-up of the cut shown in the previous figure, to illustrate in more detail the connecting elements of the ice cutting equipment.
Figure 25:
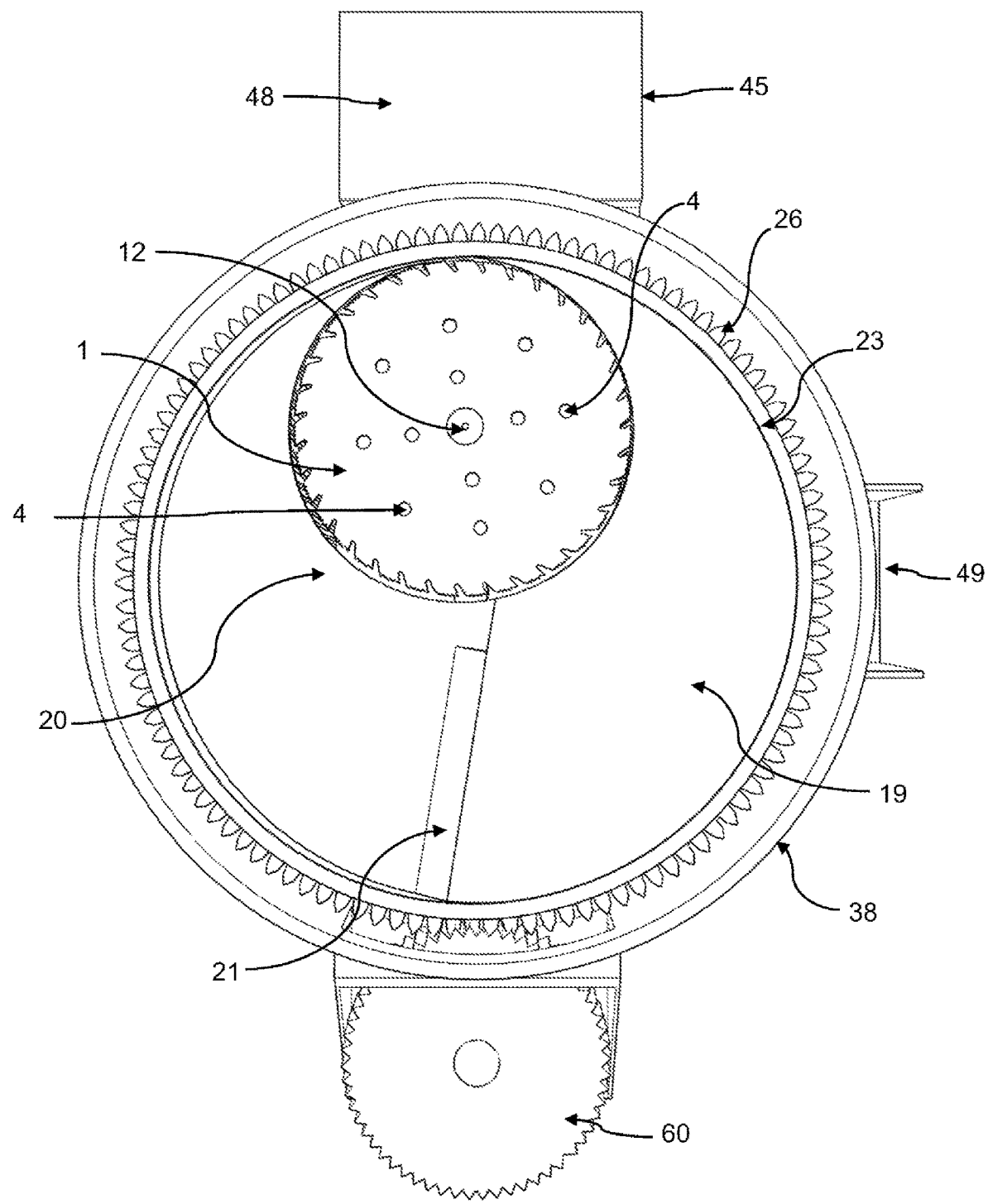
FIG. 25 is a top plan view of the ice tube cutting equipment in its assembled condition.

Beneath the plate (35), an external step (51) was provided, which encircled the entirety of the lower section (50), and below this step (51), a straight bearing (52) was affixed around said section (50). To sustain the straight bearing (52), a cylindrical tubular element (54) was included, which encircled said section (50); furthermore, this cylindrical element (54) was itself anchored by a conical bearing (55) fitted into an inner step (53) of the tubular support jacket (39). As illustrated in FIGS. 23 and 24, the lower section (50), the step (51), the straight bearing (52), the cylindrical tubular element (54), and the conical bearing (55) were all housed within the upper section of the support jacket (39); hence, the assembly of components consisting of: the blade (A), the metallic support disk (11), the cutting indicator platform (17), the circular container (22), and the transmission box (28), are supported by the step (53) of the support jacket (39). Below the external plate (35), a tubular cylindrical jacket (56) was screwed in, in a suspended manner, which encircled the upper section of the support jacket (39) where the connecting components were housed. In this case, the external jacket (56) was provided with a circular external protrusion (57) on its upper edge, projected at 90°, relative to the longitudinal axis of the jacket (56), and through this protrusion (57), the jacket (56) was screwed onto the plate (35); therefore, this protrusion (57) was also machined with 8 holes (not shown) distributed in the same way as the holes (88) and (87) of the transmission box (28) and the plate (35), respectively, so that with the same connecting bolts (92) it can be affixed to the plate (35). The other end of the jacket (56) also has a circular external protrusion (57'), projected at 90° (57') relative to the longitudinal axis of the jacket (56), but leaving a lower annular edge (58).

Figure 21:
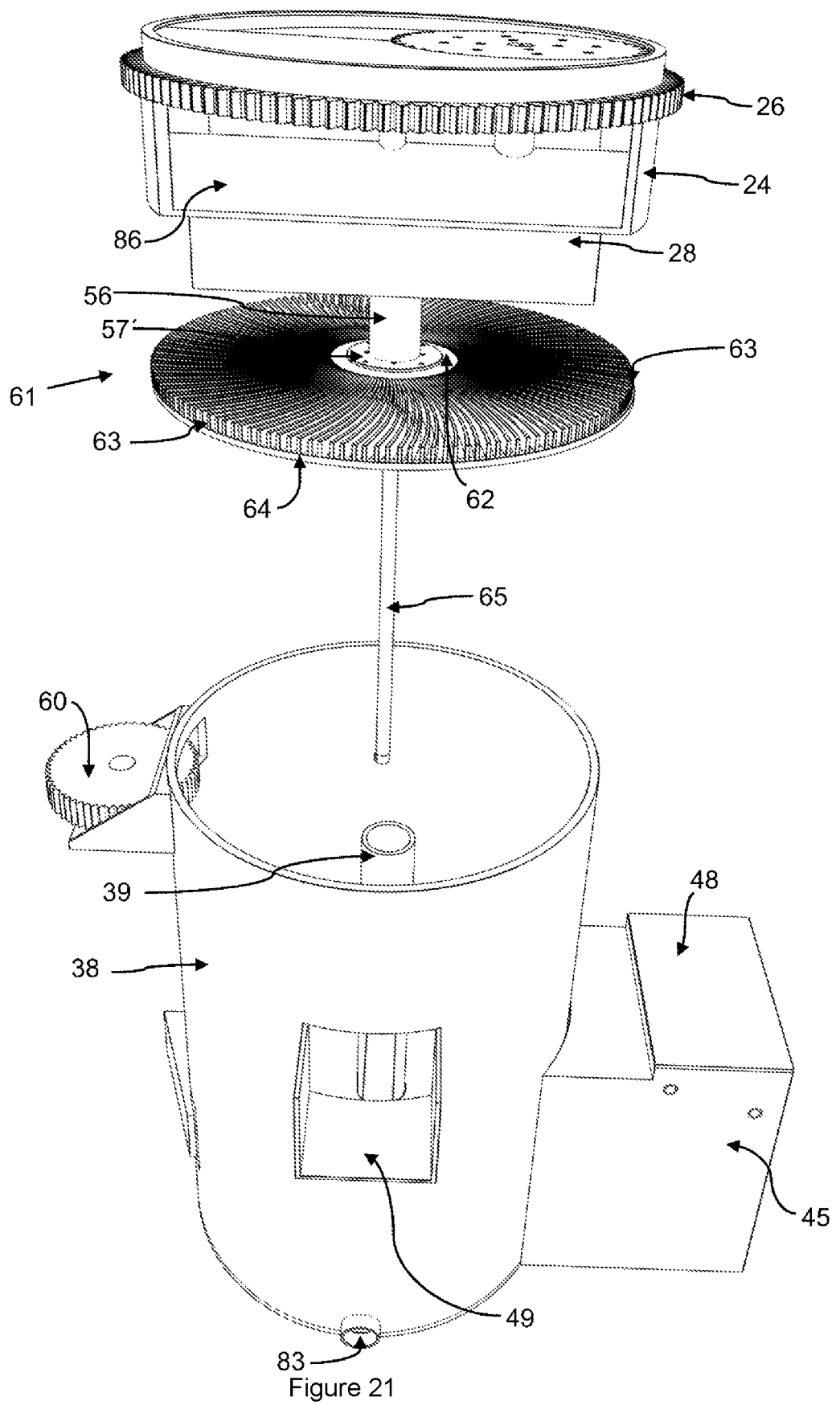
FIG. 21 is an exploded perspective view of the ice tube cutting equipment, according to the present invention.
Figure 22:
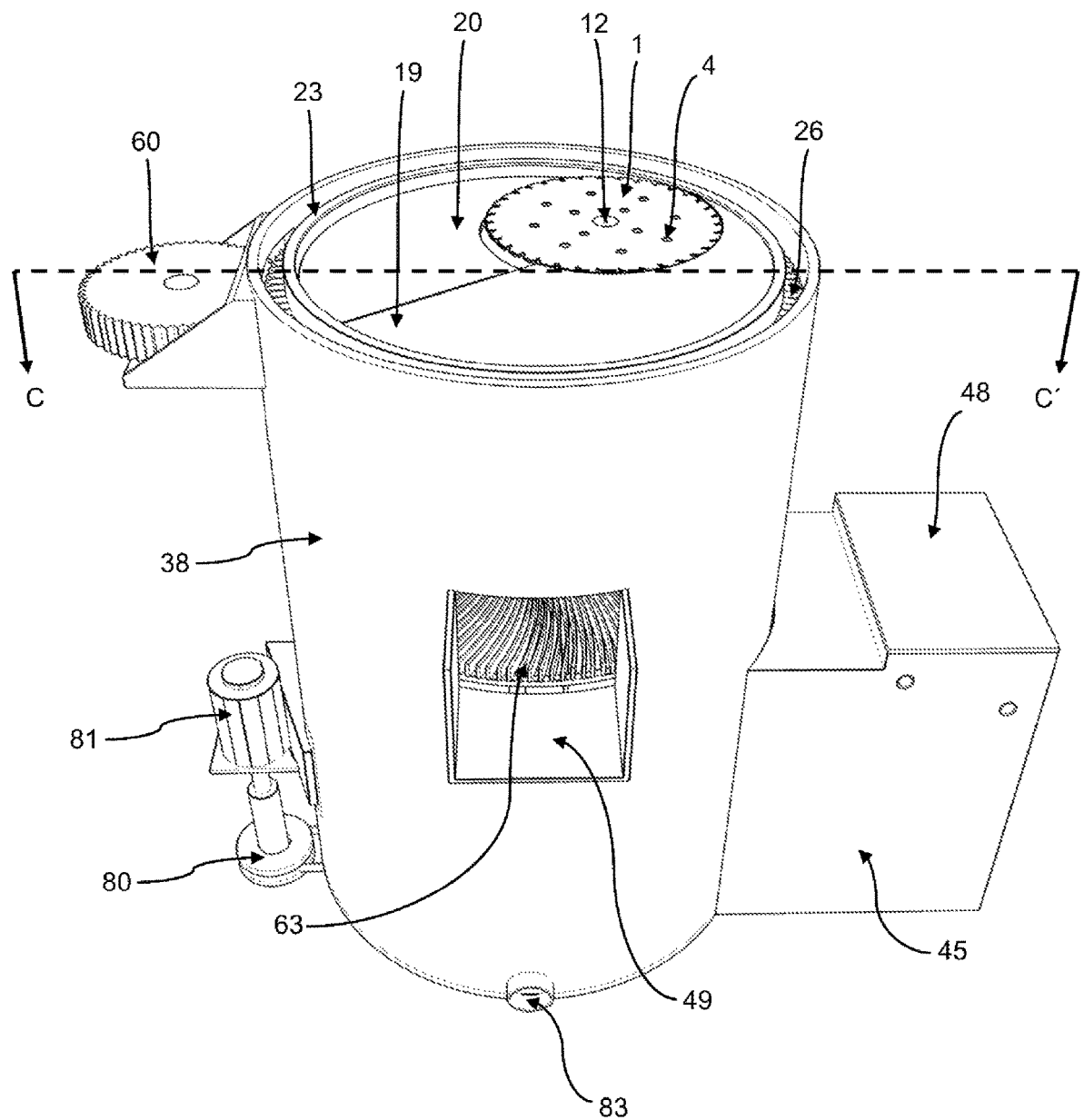
FIG. 22 is a standard perspective view of the ice tube cutting equipment in its assembled condition.

A circular strainer (61) was affixed below the jacket (56), to channel the cut ice pieces towards the lateral exit (49), see FIG. 21. In this case, the circular strainer (61) was constructed with a circular disk (62) with a central hole, which was bolted beneath the protrusion (57') of the jacket (56), and its annular edge (58) was inserted into the central hole of said disk (62); and a series of rigid, slightly corrugated metallic strips (63) were welded around the disk (61), in a collinear plane and projected radially. The length and spacing of these metallic strips (63) were such that they prevented the ice pieces, cut by the blade (A), from falling to the bottom of the container (38), and allowed the circular strainer (61) to rotate and channel the ice pieces towards the outlet (49). A ring (64) was welded to the lower ends of the metal strips (63) to give them rigidity. Thus, this circular strainer (61) was also joined in a suspended manner, as it was connected to the jacket (56), which was also joined in a suspended manner.

Obviously, the ice tube cutting equipment included a transmission motor (81) to facilitate the rotary movement of the circular blade (A), which in this instance was 1400 rpm. For this purpose, a main shaft (65) was used, which was positioned longitudinally within the support jacket (39), extending internally through the ducts of both the lower (50) and upper sections (32) of the connecting piece (36), and accompanied by its respective bearing (33), until connecting, via a key (not illustrated) provided at its upper end, with the central gear (30) of the transmission box (28), to impart rotational movement to said central gear (30), and this in turn rotates the adjacent gear (29), through contact between them. The lower section of the main shaft (65) that passes through the base of the cylindrical tank (38) is tightly encircled by the lower bearing (77) and the bearing of the journal bearing (78), to ensure a smoother rotary motion of said main shaft (65); and at its end that protrudes from the base of the cylindrical tank (38), a belt pulley (79) was included, which was connected with another pulley (80), which is driven by a transmission motor (81). In this way, rotational movement is imparted to the circular blade (A) around its own axis at 1400 rpm.

Figure 8:
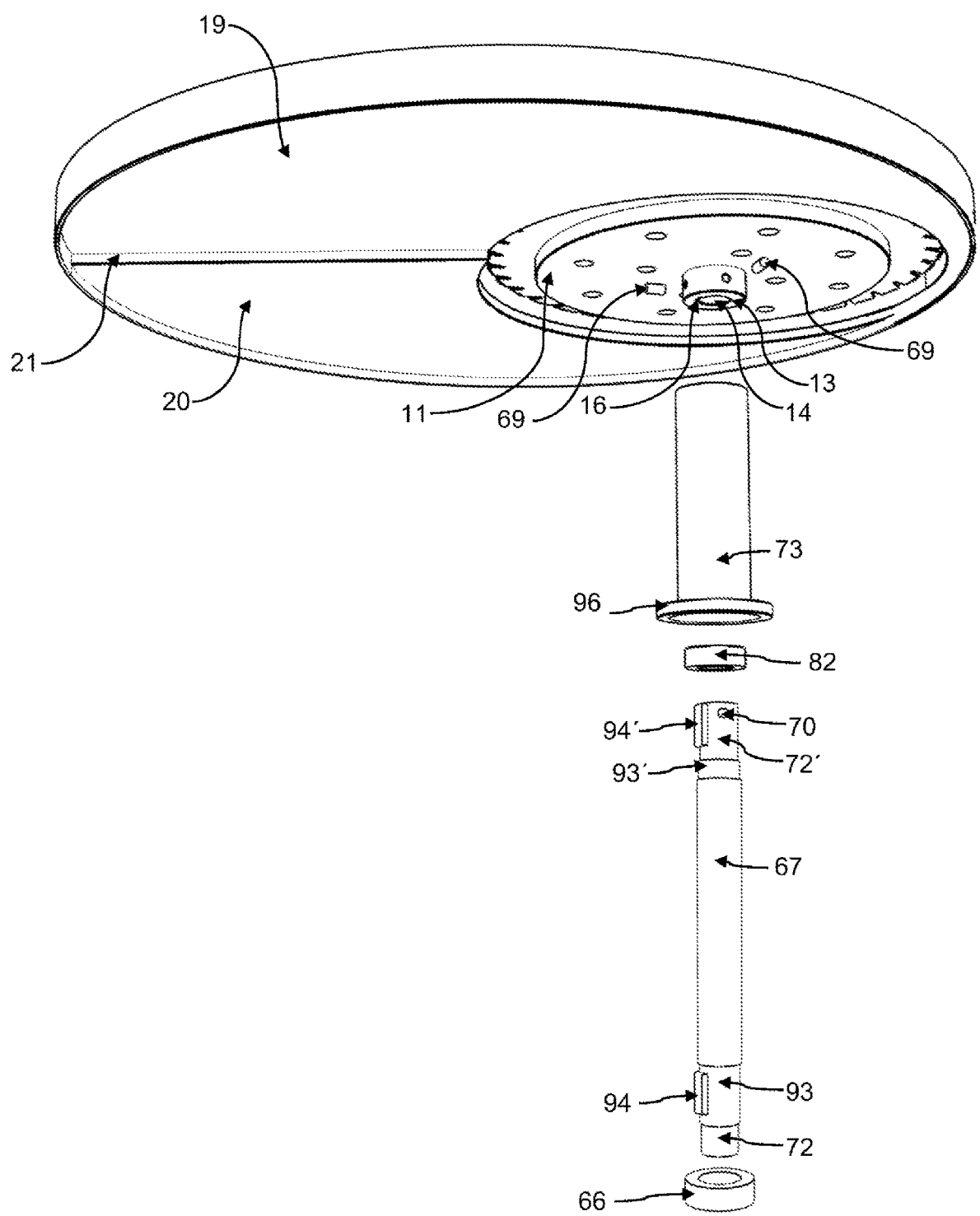
FIG. 8 is a bottom perspective view of FIG. 6, where an exploded view of the elements of a rotating shaft that supports and rotates the support disc that in turn supports the circular blade is observed.

A rotating shaft (67) connected the adjacent gear (29) to the supporting metallic disk (11), where the ends of the rotating shaft (67) had 2 different diameters; where the tips (72) and (72') had the smaller diameter, while the adjoining segments (93) and (93') had a mid-sized diameter, compared to the rest of the body of the rotating shaft (67), see FIG. 8. A key (94) was longitudinally machined into the upper part of section (93); and also, another key (94') was longitudinally machined on the upper tip (72') of said rotary shaft (67), and two transverse bores (70). To install the rotating shaft (67), its lower tip (72) was passed through the central duct (68) of the adjacent gear (29) until it reached the bottom of the bearing cup cavity (32') where a bearing (66) is placed, thus the lower tip (72) was inserted into the hole of the bearing (66), but without contacting the bottom of the cup (32'), in such a way that said bearing (66) turns the rotating shaft (67); and the contiguous portion (93) was housed in the central duct (68) of the adjacent gear (29) and its key (94) inserted into a longitudinal cavity provided in the duct (68), to securely fix the rotating shaft (67) to the adjacent gear (29), moreover, the portion with the larger diameter acted as a stop to maintain the position of the adjacent gear (29) as it rotates.

Figure 26:
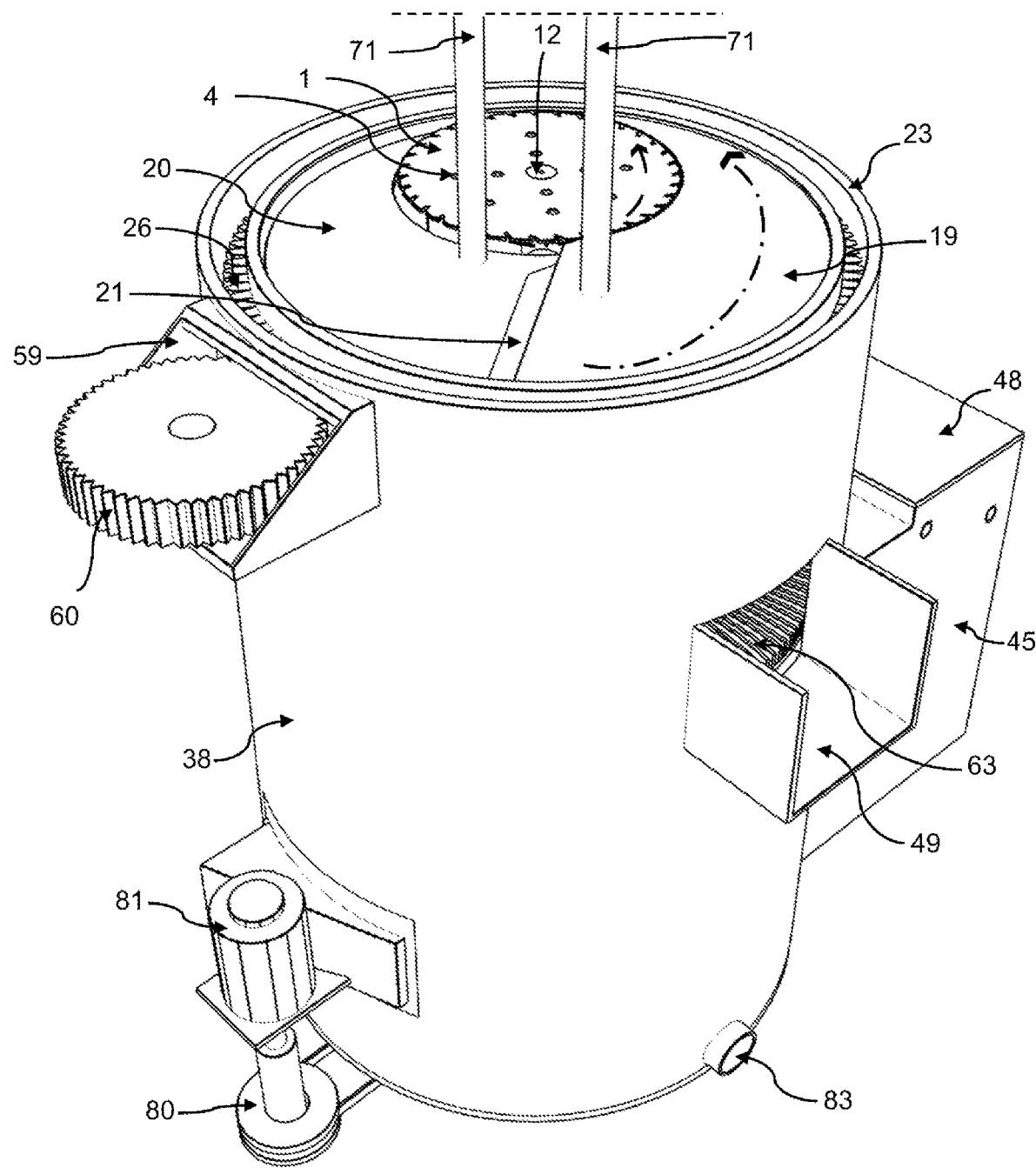
FIG. 26 is a conventional perspective view of the ice cutting equipment, in question, in operation, where through dashed arrows the rotary movements of the circular blade and the circular container are indicated, to make the cut of the ice tubes.

The upper end of the rotating shaft (67) passes through the hole (27) of the container (22) until its tip (72') is inserted into the circular cavity (14) of the bush (13), where said tip was secured by inserting its key (94') into the internal radial groove (16) of the circular bush (13) and by introducing some bolts (69) through the lateral holes (15) of the bush (13), until they are inserted into the bores (70) of the rotating shaft (67). A tubular jacket (73) was used, which was machined perpendicularly with a circular external base (96) with holes (not illustrated), at one of its ends, to surround the portion of the rotating shaft (67) between the base (25) of the circular container (22) and the support disc (11); therefore, the external base (96) of the jacket (73) was bolted onto the flange (95) of the base (25) of the container (22), see FIG. 23. A bearing (82) surrounded the portion (93') of the shaft (67), where said bearing (82) was housed within the upper end of the jacket (73), for this, an annular notch (not illustrated) was made in the internal walls of the upper end of the jacket (73), with adequate dimensions to house the bearing (82), in such a way that an annular stop with the upper edge of the jacket (73) and an annular step were originated to hold said bearing (82) to assist the rotating movement of the shaft (67). In this manner, the support disk (11) had a rotating movement which also spins the circular blade (A), performing tangential cuts in the ice tubes (71), as illustrated in FIG. 26.

In said ice-cutting equipment, a gearmotor (not illustrated) was included, to rotate the gear (60), which in turn rotated the entire circular container (22) at 8 rpm, by making contact with its toothed belt (26), in such a way that the circular blade (A) has a translational movement with respect to the central and longitudinal axis of the container (37), thereby achieving the cutting of all the ice tubes that fall vertically onto the cutting equipment, cutting the bars that fall onto the low-level portion (20) of the platform (17), then, with the translational movement, the ice tubes that were in the upper portion (19) slide down the inclined step (21) towards the lower level portion (20) and are cut by the circular blade (A).

Example 3. Use of the Ice Tube Cutting Device, with a Single Circular Blade in a Conventional Vertical Ice Tube Evaporator This cutting equipment was attached to the bottom of a conventional vertical tube evaporator containing a substantial amount of tubing (not illustrated). Within the tubes of said evaporator, drinkable water circulates, these tubes serve as a contact wall to transmit the cold temperature generated by the system's refrigerant. Simultaneously, the tubing acts as a mold to give its final shape to the ice. Once the desired ice density was achieved, the refrigeration process in the evaporator reversed, turning it into a heat pump. Once the operation was reversed, the ice tubes (71) formed through heat contact within the system, dislodged vertically due to gravity and fall onto the cutting equipment described in Example 2, where the circular blade (A) rotates at 1400 rpm to cut the ice tubes (71) that were located on the lower section (20) of the cutting indicator platform (17), where the ice tubes (71) were cut to a length of 4 cm; and at the same time the circular container (22) rotated at 8 rpm, which gave a translational movement to the blade (A), enabling it to cut through all the ice tubes. The ice pieces cut to a length of 4 cm, slid due to gravity until they reached the circular strainer (61), which, with its rotational movement provided by the circular container (22), swept these ice pieces to expel them towards the exit (49) of the cylindrical tank (38).

It should be clarified that by the expression "ice pieces", we refer to the pieces of the ice tubes correctly cut by the circular blade (A) as a finished product ready for commercial distribution. Furthermore, the term "ice tube" should be interpreted to mean that the ice tube may be hollow or solid.

Some advantages of the ice tube cutter of this invention include:

Thanks to the pattern of the teeth on its circular blade (A), it generates the least amount of crushed ice as waste.

Lower noise decibels during ice cutting, as well as minimal vibrations due to its low contact area during the cutting.

The cut made on the ice tubes is finer, causing less ice wastage.

Lower energy consumption.

Lower water consumption, due to the gravity-driven channeling of frost, ice fragments, and water toward the collection tank (45), where they come into contact with "fresh" water at room temperature, achieving a significant heat exchange, to help in the pre-cooling of the water, taking advantage of the reduction in energy or negative BTU/h, attaining more production at a lower energy cost.

The invention claimed is:

1. A circular toothed blade for cutting ice cubes having a disk (1) with a central hole (2), said circular toothed blade comprising: a series of protrusions (5) separated by notches (3) configured to prevent clogging by frost or ice pieces, said series of protrusions (5) projecting at an angle between 0 and 90° on the peripheral edge of the disk (1), wherein each protrusion of said series of protrusions (5) comprises a series of teeth, with each tooth having a tip with a different angulation from each other, and an angle between each tooth being different from each other.

2. The circular toothed blade of claim 1, wherein the series of protrusions (5) comprises 29 to 35 protrusions, separated by said truncated conical notches (3) and projected at 45°.

3. The circular toothed blade of claim 1, where the series of teeth consists of a first tooth, a second tooth, a third tooth, a fourth tooth, and a fifth tooth, wherein the tips of the first tooth, the second tooth, the third tooth, the fourth tooth, and the fifth tooth have an angulation of 53°, 71°, 76°, 54°, and 73°, respectively; and an angle between the first tooth and the second tooth is 88°, an angle between the second tooth and the third tooth is 79°, an angle between the third tooth and the fourth tooth is 59°, and an angle between the fourth tooth and the fifth tooth is 74°.

4. The circular toothed blade of claim 1, further including fastening means (34) distributed throughout the entire area of the circular toothed blade.

5. The circular toothed blade of claim 4, wherein the fastening means (34) comprises holes, protrusions, bores, or a combination thereof.

6. An ice tube cutting device including at least one circular toothed blade (A) according to claim 1, the cutting device further comprising:

a support element (11) attached to the at least one circular toothed blade (A) and configured to support and provide stability to said at least one circular toothed blade (A);

a cutting indicator platform (17) configured to operatively engage with the at least one circular toothed blade (A) and the support element (11), wherein the cutting indicator platform (17) includes at least one hole (18) positioned between a central point and a peripheral point of the cutting indicator platform (17), the at least one hole (18) being dimensioned to receive the at least one circular toothed blade (A) and to permit rotational movement of the at least one circular toothed blade (A), said cutting indicator platform (17) comprises a first level and a second level, wherein the first level is elevated relative to the second level, and a height difference between the first level and the second level determines a cutting length of ice tubes (71), and the at least one circular toothed blade (A) is positioned at a height corresponding to the first level of the cutting indicator platform (17);

a circular container (22) configured to house and support an assembly comprising the cuffing indicator platform (17), the support element (11), and the at least one circular toothed blade (A), wherein the circular container (22) includes an open top, open opposing lateral sides, and open lower sections adjacent to the opposing lateral sides, thereby defining an upper smooth ring (23) and a lower rectangular section, the lower rectangular section comprising remaining portions of the opposing lateral sides (24) and a base (25), where an external toothed belt (26) is disposed on the upper smooth ring (23), and the base (25) includes a hole (27) positioned between a central point and a peripheral point of the base (25), the hole (27) having a flange (95) disposed therein, said cutting indicator platform (17) is press-fitted onto the top of the circular container (22) at the upper smooth ring (23);

a transmission box (28) externally affixed to a bottom of the base (25) of the circular container (22), wherein the transmission box (28) contains a central transmission gear (30), an adjacent transmission gear (29), and a central hole (31); a bearing cup (32) is secured within the transmission box (28) above the central hole (31), said bearing cup (32) having an upper edge with a stop (90) and a base with a step (91), the stop (90) and the step (91) defining a space to securely house a bearing (33) configured to support and facilitate rotational movement of the central transmission gear (30);

a container (37) configured to house, support, and protect internal components of the equipment comprising a cylindrical tank (38) having a closed lower end with a central hole (89) and an open upper end: a tubular support jacket (39) open at both ends and vertically secured within the cylindrical tank (38) with a lower end of the tubular support jacket (39) inserted into the central hole (89) of the cylindrical tank (38): a flange (75) positioned inside and at a base of the cylindrical tank (38) and encircling a section of the lower end of the tubular support jacket (39) to secure the tubular support jacket (39): a plug-plate (76) externally screwed onto the base of the cylindrical tank (38) and coupled with the flange (75) and including a central hole configured to allow passage of a transmission element: a bearing cup (74) affixed within the tubular support jacket (39) and positioned atop an inner section of the plug-plate (76): a lower bearing (77) housed within the bearing cup (74) and configured to facilitate rotational movement of the transmission element, and an upper end of the tubular support jacket (39) comprising an internal annular step (53);

a tubular connecting piece (36) configured to operatively couple the at least one circular toothed blade (A), the support element (11), the cutting indicator platform (17), the circular container (22), and the transmission box (28) to the container (37), wherein the tubular connecting piece (36) comprises a tubular body (50) having an upper end with an external plate (35) extending perpendicularly around the tubular body (50), the external plate (35) being fixed beneath the transmission box (28); and an annular step (51) disposed below the external plate (35) and encircling the tubular body (50) which is received within an upper end of the tubular support jacket (39);

a straight bearing (52) encircling the tubular body (50) and disposed beneath the annular step (51);

a cylindrical tubular element (54) encircling the tubular body (50) and being configured to support the straight bearing (52);

a conical bearing being disposed beneath the cylindrical tubular element (54) and received within the internal annular step (53) of the tubular support jacket (39);

a cylindrical tubular jacket (56) fixed in a suspended manner beneath the external plate (35) and encircling an upper section of the tubular support jacket (39) to house the connecting components, wherein the cylindrical tubular jacket (56) includes a first circular external protrusion (57) at an upper edge thereof, the first circular external protrusion (57) extending perpendicularly relative to a longitudinal axis of the cylindrical tubular jacket (56) and being attached to the external plate (35), and a second circular external protrusion (57') at a lower edge thereof, the second circular external protrusion (57') extending perpendicularly relative to the longitudinal axis of the cylindrical tubular jacket (56) and defining a lower annular edge (58);

a circular strainer (61) fixed beneath the cylindrical tubular jacket (56) and configured to channel ice pieces cut by the at least one circular toothed blade (A) toward a lateral exit (49) of the cylindrical tank (38), wherein the circular strainer (61) comprises a circular disk (62) having a perforated center being affixed beneath the second circular external protrusion (57') of the cylindrical tubular jacket (56), and with the lower annular edge (58) of the cylindrical tubular jacket (56) being inserted into the perforated center of the circular disk (62), a plurality of rigid, slightly corrugated metallic strips (63) welded around the circular disk (62) in a collinear plane and extending radially, wherein the corrugated metallic strips (63) are dimensioned and spaced to prevent passage of the ice pieces cut by the at least one circular toothed blade (A) to a bottom of the cylindrical tank (38) while enabling rotational movement of the circular strainer (61) to direct the ice pieces toward the lateral exit (49), and a ring (64) welded to bottom ends of the metallic corrugated strips (63) to provide structural rigidity to the metallic corrugated strips (63);

a main shaft (65) longitudinally disposed within the tubular support jacket (39) and extending through a duct of the tubular body (50) and the bearing cup (32) of the tubular connecting piece (36) with the bearing (33), wherein the main shaft (65) connects to the central transmission gear (30) of the transmission box (28) via a key located at an upper end of said main shaft (65) to impart rotary motion to the central transmission gear (30), which in turns engages the adjacent transmission gear (29) to rotate the adjacent transmission gear (29): a lower end section of the main shaft (65) passing through a base of the cylindrical tank (38) and being tightly encircled by the lower bearing (77) and the journal bearing (78) to enhance smoothness of the rotary motion of the main shaft (65), and an end of the main shaft (65) extending outside the base of the cylindrical tank (38);

a belt pulley (79) coupled to another pulley (80) which is driven by a transmission motor (81) to impart rotational motion to the at least one circular toothed blade (A);

a rotating shaft (67) configured to connect the adjacent transmission gear (29) to the support element (11), wherein the rotating shaft (67) comprises a body having a first end with a first tip (72) and a first adjoining section (93), and a second end with a second tip (72') and a second adjoining section (93'), the first tip (72) and the second tip (72') each having a smaller diameter than the first adjoining section (93) and the second adjoining section (93'), and the first adjoining section (93) and the second adjoining section (93') each having an intermediate diameter relative to a central section of the body of the rotating shaft (67); a first key (94) longitudinally machined on the first adjoining section (93), a second key (94') longitudinally machined on the second tip (72') along with two transverse bores (70), wherein the first tip (72) extends through a central duct (68) of the adjacent transmission gear (29) and is inserted into a bore of a bearing (66) positioned at a bottom of a bearing cup cavity (32') without contacting the bottom of the bearing cup cavity (32'), the first adjoining section (93) is received within the central duct (68) of the adjacent transmission gear (29) with the first key (94) inserted into a longitudinal cavity of the central duct (68) to securely fasten the rotating shaft (67) to the adjacent transmission gear (29), the central section of the body of the rotating shaft (67) having a larger diameter configured to act as a stop to retain the adjacent transmission gear (29) during rotation, and the second end of the rotating shaft (67) extends through the hole (27) of the circular container (22) with the second tip (72') inserted into a circular cavity (14) of the circular bush (13), said second tip (72') being fixed to the circular bush (13) by the second key (94') engaging an internal radial groove (16) of the circular bush (13) and by bolts (69) inserted through lateral holes (15) of the circular bush (13) into the transverse bores (70) of the rotating shaft (67);

a tubular jacket (73) extending perpendicularly to an external circular base (96) with holes at one end, said tubular jacket (73) configured to surround a portion of the rotating shaft (67) located between the base (25) of the circular container (22) and the support element (11), wherein the external circular base (96) of the tubular jacket (73) is fixed to the flange (27) at the base (25) of the circular container (22), and an upper end of the tubular jacket (73) includes an annular recess on internal walls thereof, forming an annular stop at the upper edge of the tubular jacket (73) and an annular step configured to provide support;

a bearing (82) encircling the second adjoining section (93') of the rotating shaft (67) and configured to facilitate rotational movement of the rotating shaft (67) to impart rotary motion to the support element (11); and a gear motor configured to rotate a gear (60) that engages the external toothed belt (26) of the circular container (22) to rotate the circular container (22), thereby imparting translational movement to the at least one circular toothed blade (A) relative to a central longitudinal axis of the container (37).

7. The cutting device of claim 6, wherein the support element comprises a metallic support disk (11) having a diameter smaller than a diameter of the at least one circular toothed blade (A), the metallic support disk (11) including a circular protrusion (12) at a center of an upper face thereof, the circular protrusion (12) being configured to be press-fitted into the central hole (2) of the at least one circular toothed blade (A), and a plurality of holes (34') arranged in a pattern corresponding to a pattern of holes (34) in the at least one circular toothed blade (A), wherein connecting bolts (4) extend through the holes (34) of the at least one circular toothed blade (A) and are press-fitted into the holes (34') of the metallic support disk (11) to securely join the at least one circular toothed blade (A) and the metallic support disk (11) for rotational movement, and wherein the metallic support disk (11) further includes a circular bush (13) at a center of a bottom face thereof, the circular bush (13) having a circular cavity (14) configured to connect to a transmission system element, the circular bush (13) including at least two lateral holes (15) and an internal radial groove (16) for receiving a fixing element to secure the metallic support disk (11) to the transmission system element.

8. The cutting device of claim 7, wherein the diameter of the metallic support disk (11) is 30% smaller than the diameter of the at least one circular toothed blade (A).

9. The cutting device of claim 6, wherein a step (21) is inclined at 45° relative to a horizontal plane of the first level (19) and the second level (20) of the cutting indicator platform (17), the inclined step (21) being configured to facilitate sliding of the ice tubes (71) from the first level (19) to the second level (20) while preventing the ice tubes (71) from being damaged during sliding.

10. The cutting device of claim 6, wherein the inclination of the step (21) is equal to 90% of a length of said step.

11. The cutting device of claim 6, wherein the circular container (22) further comprises a central support (84) disposed at a central point of the base (25) and secured vertically to the base (25) by flanges (85), the central support (84) being configured to support the cutting indicator platform (17) beneath a central point thereof to maintain structural integrity of the cutting indicator platform (17) under a weight of the ice tubes (71).

12. The cutting device of claim 6, wherein the circular container (22) further comprises a sawhorse structure (86) disposed on the base (25), the sawhorse structure (86) being configured to guide at least one of cut ice tube pieces, ice slush, or water towards a bottom of the cutting device.

13. The cutting device of claim 6, wherein a base of the transmission box (28), the external plate (35), and the first circular external protrusion (57) of the cylindrical tubular jacket (56) include fastening elements arranged in a corresponding pattern to secure the base of the transmission box (28), the external plate (35), and the first circular external protrusion (57) together.

14. The cutting device of claim 13, wherein the fastening elements comprise holes (88) in the transmission box (28), holes (87) in the external plate (35), holes in the first circular external protrusion (57) of the cylindrical tubular jacket (56), and union bolts (92) configured to extend through the holes (88), the holes (87), and the holes in the first circular external protrusion (57) to secure the transmission box (28), the external plate (35), and the first circular external protrusion (57) together.

15. The cutting device of claim 6, wherein the container (37) further comprises:
- a journal bearing (78) secured to a lower surface of the plug-plate (76) by bolts and configured to assist in the rotational movement of the transmission element;
- at least two shafts (40) horizontally fixed between the tubular support jacket (39) and internal walls of the cylindrical tank (38), the at least two shafts (40) being configured to enhance vertical stability of the tubular support jacket (39);
- a ramp disposed below the at least two shafts (40) and configured to channel frost and ice fragments, the ramp comprising a first sheet (41) and a second sheet (41'), each sheet having edges configured to seal against an inner wall of the cylindrical tank (38) and including a hole (42) through which the tubular support jacket (39) extends, wherein the first sheet (41) and the second sheet (41') are fixed at a 450 inclination relative to a vertical axis of the cylindrical tank (38) in a complementary arrangement, with the first sheet (41) positioned above the second sheet (41') and overlapping at a location of the tubular support jacket (39), and wherein the holes (42) of the first sheet (41) and the second sheet (41') are sealed against external walls of the tubular support jacket (39) to direct the frost and ice fragments away from a bottom of the cylindrical tank (38);
- a lower lateral hole (43) provided on said cylindrical tank (38) and configured to allow frost, ice fragments, and water to exit the cylindrical tank (38);
- a first strainer (44) vertically positioned at a lower end of the second sheet (41') and aligned with the lower lateral hole (43) of the cylindrical tank (38), the first strainer (44) being configured to capture frost and ice fragments produced by a cutting action of the at least one circular toothed blade (A);
- a second strainer (44') horizontally fixed externally at a junction of a lower edge of the second sheet (41') and a lower edge of the first strainer (44), the second strainer (44') being configured to retain frost and ice fragments not captured by the first strainer (44);
- a collection tank (45) disposed at the lower lateral hole (43) of the cylindrical tank (38) and configured to collect frost, ice fragments, and water discharged from the circular toothed blade (A);
- a dividing wall (46) vertically disposed above the first strainer (44) and configured to block passage of frost and ice fragments during overflow;
- a water source provided in the collection tank (45) and including a valve with a float (47) configured to interrupt water flow when a water level in the collection tank (45) reaches a predetermined limit, wherein the water source is configured to supply water to the collection tank (45) to facilitate melting of frost and ice pieces discharged onto the first strainer (44) and the second strainer (44');
- a cap (48) configured to cover a top portion of the collection tank (45);
- a bottom outlet (83) installed on said cylindrical tank (38) and configured to connect to a water pump motor for recirculating water to an ice-making cooling unit;
- a lateral outlet (49) provided on the cylindrical tank (38) and being configured to allow exit of cut ice pieces from the cylindrical tank (38); and
- an upper lateral hole (59) provided in the cylindrical tank (38) and being configured to receive the gear (60) which is positioned to engage the external toothed belt (26) of the circular container (22).

16. The cutting device of claim 6, wherein the tubular connecting piece (36) is formed as a single integral piece comprising the tubular body (50), the bearing cup (32), the external plate (35) disposed at a junction where the tubular body (50) meets the bearing cup (32), and the annular step (51).

17. The cutting device of claim 6, further comprising an adjusting cutting plate having a configuration and dimensions corresponding to those of the lower half (20) of the cutting indicator platform (17), the adjusting cutting plate being horizontally and parallelly disposed above the second level (20) at a height determined by a desired cut length of the ice tubes (71), the adjusting cutting plate being secured by fixing and supporting elements.

* * * * *